United States Patent
Chen et al.

(10) Patent No.: US 9,341,820 B2
(45) Date of Patent: May 17, 2016

(54) IMAGE CAPTURING OPTICAL SYSTEM, IMAGE CAPTURING DEVICE AND ELECTRONIC DEVICE

(71) Applicant: LARGAN PRECISION CO., LTD., Taichung (TW)

(72) Inventors: Kuan-Ming Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/534,986

(22) Filed: Nov. 6, 2014

(65) Prior Publication Data
US 2016/0062084 A1   Mar. 3, 2016

(30) Foreign Application Priority Data
Aug. 26, 2014 (TW) ............... 103129318 A

(51) Int. Cl.
G02B 13/18 (2006.01)
G02B 9/60 (2006.01)
G02B 13/00 (2006.01)
H04N 5/225 (2006.01)

(52) U.S. Cl.
CPC .............. G02B 13/0045 (2013.01); G02B 9/60 (2013.01); H04N 5/2254 (2013.01)

(58) Field of Classification Search
CPC ....... G02B 9/60; G02B 13/0045; G02B 13/18
USPC .......... 359/708, 714, 753, 763, 764
See application file for complete search history.

(56) References Cited

U.S. PATENT DOCUMENTS

| | | | |
|---|---|---|---|
| 4,753,521 A | 6/1988 | Deserno | |
| 4,832,465 A | 5/1989 | Arai et al. | |
| 2010/0165485 A1 | 7/2010 | Do | |
| 2010/0265593 A1* | 10/2010 | Tang | ........... G02B 13/0045 359/663 |

FOREIGN PATENT DOCUMENTS

| | | |
|---|---|---|
| JP | 2009294527 A | 12/2009 |
| JP | 2012145839 A | 8/2012 |
| TW | 201333519 A1 | 8/2013 |
| TW | 201348736 A | 12/2013 |
| WO | 2012172781 A1 | 12/2012 |

* cited by examiner

*Primary Examiner* — William Choi
(74) *Attorney, Agent, or Firm* — Locke Lord LLP; Tim Tingkang Xia, Esq.

(57) ABSTRACT

The present disclosure provides an image capturing optical system comprising: a positive first lens element having a convex object-side surface; a negative second lens element having a concave object-side surface; a third lens element; a fourth lens element having a convex object-side surface and a concave image-side surface, the object-side surface and the image-side surface thereof being aspheric; a fifth lens element having a concave image-side surface concave, both of the object-side surface and the image-side surface being aspheric, at least one of the object-side surface and the image-side surface having at least one convex shape in an off-axis region thereof.

11 Claims, 23 Drawing Sheets

IMAGE CAPTURING OPTICAL SYSTEM, IMAGE CAPTURING DEVICE AND ELECTRONIC DEVICE

RELATED APPLICATIONS

This application claims priority to Taiwan Application Serial Number 103129318, filed Aug. 26, 2014, which is incorporated by reference herein in its entirety.

BACKGROUND

1. Technical Field

The present disclosure relates to an image capturing optical system and an image capturing device, and more particularly, to an image capturing optical system and an image capturing device applicable to electronic devices.

2. Description of Related Art

As personal electronic products nowadays has been becoming more and more compact, the internal components of the electronic products are also required to be smaller in size than before. Except for the demand of miniaturization, the advanced semiconductor manufacturing technologies reducing the pixel size of sensors have also pushed compact optical systems to evolve toward the field of higher megapixels. In addition, the popularity of smart phones and tablet personal computers also significantly increases the requirements for high resolution and image quality of present compact optical systems. Therefore, there is also an increasing demand for compact optical systems featuring better image quality.

In a conventional five-element optical system, the fourth lens element generally has a convex image-side surface. However, under this configuration, the convex image-side surface of the fourth lens element has a larger curvature and the variation of the thickness of the lens is more pronounced, thus shortcomings, such as formation difficulties of lenses and excessive optical sensitivity may occur easily. Moreover, the refractive power of the second lens element in the conventional five-element optical system is usually poorly distributed and unable to effectively balance the positive refractive power of the first lens element, thus the light will bend drastically and the aberration cannot be eliminated easily.

Therefore, a need exists in the art for an optical system that features compact size, better image quality, and an appropriate sensitivity of the system.

SUMMARY

According to one aspect of the present disclosure, an image capturing optical system, comprising, in order from an object side to an image side: a first lens element with positive refractive power having an object-side surface being convex in a paraxial region thereof; a second lens element with negative refractive power having an object-side surface being concave in a paraxial region thereof; a third lens element with refractive power; a fourth lens element with refractive power having an object-side surface being convex in a paraxial region thereof and an image-side surface being concave in the paraxial region thereof, the object-side surface and the image-side surface thereof being aspheric; and a fifth lens element with refractive power having an image-side surface being concave in a paraxial region thereof, an object-side surface and the image-side surface thereof being aspheric, at least one of the object-side surface and the image-side surface having at least one convex shape in an off-axis region thereof; wherein the image capturing optical system has a total of five lens elements with refractive power and an air gap is arranged between any two adjacent lenses with refractive power; wherein a focal length of the second lens element is f2, a focal length of the first lens element is f1, a curvature radius of the object-side surface of the second lens element is R3, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$$-0.88 < f2/f1 < 0;$$

$$0 < R3/f2; \text{ and}$$

$$0.25 < T12/(T23+T34+T45).$$

According to another aspect of the present disclosure, an image capturing optical system comprising, in order from an object side to an image side: a first lens element with positive refractive power having an object-side surface being convex in a paraxial region thereof; a second lens element with negative refractive power having an object-side surface being concave in a paraxial region thereof; a third lens element with refractive power; a fourth lens element with refractive power having an object-side surface being convex in a paraxial region thereof and an image-side surface being concave in a paraxial region thereof, the object-side surface and the image-side surface thereof being aspheric; and a fifth lens element with refractive power having an object-side surface being convex in a paraxial region thereof and an image-side surface being concave in a paraxial region thereof, the object-side surface and the image-side surface thereof being aspheric, the image-side surface having at least one convex shape in an off-axis region thereof; wherein the image capturing optical system has a total of five lens elements with refractive power and an air gap is arranged between any two adjacent lens elements with refractive power; wherein a focal length of the second lens element is f2, a focal length of the first lens element is f1, a curvature radius of the object-side surface of the second lens element is R3, and the following conditions are satisfied:

$$-1.0 < f2/f1 < 0; \text{ and}$$

$$0 < R3/f2.$$

According to yet another aspect of the present disclosure, an image capturing device comprises the aforementioned image capturing optical system and an image sensor.

According to yet another aspect of the present disclosure, an electronic device comprises the aforementioned image capturing device.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
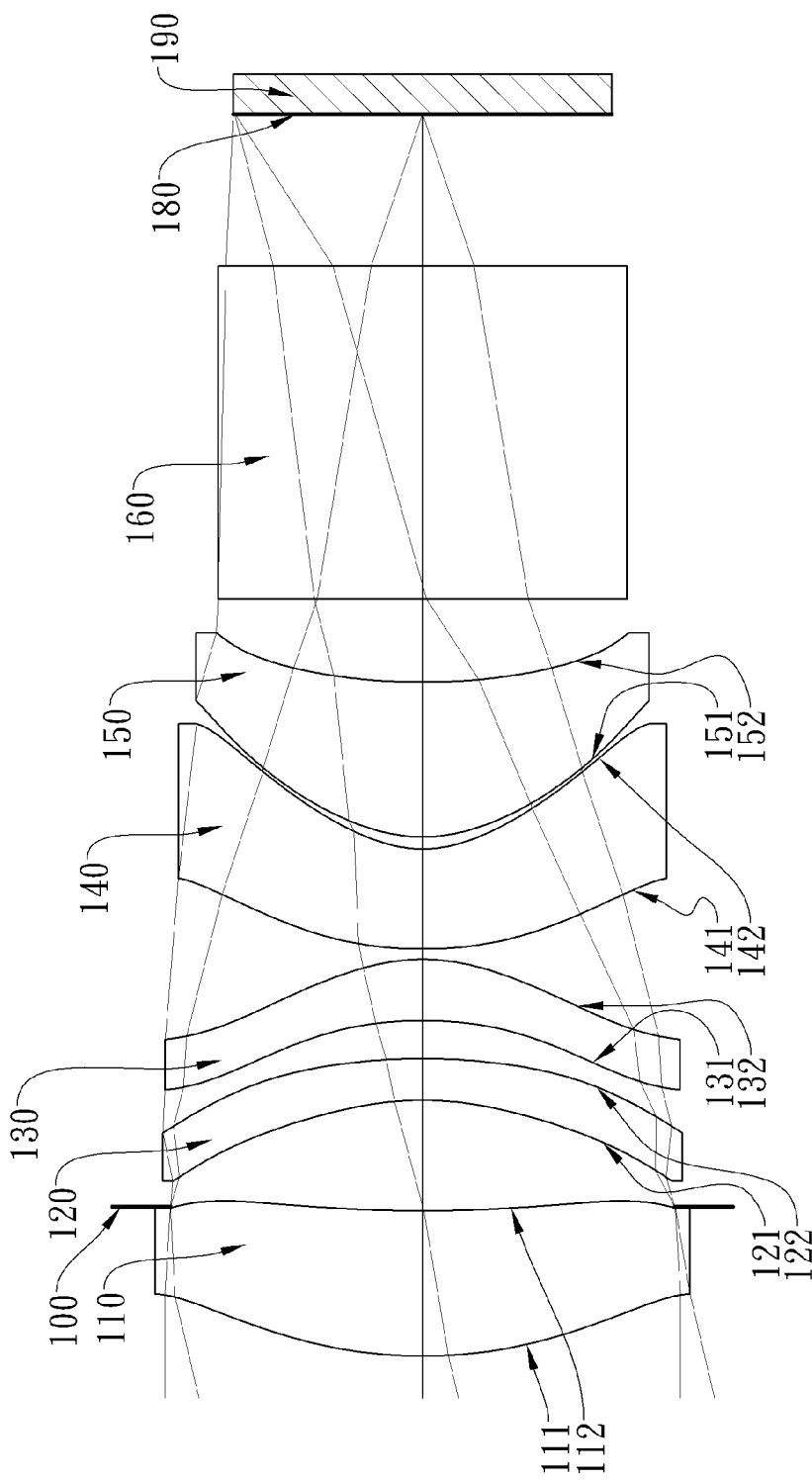
FIG. 1A is a schematic view of an image capturing device according to the 1st embodiment of the present disclosure.

The present disclosure provides an image capturing optical system comprising, in order from an object side to an image side: a first lens element with refractive power; a second lens element with refractive power; a third lens element with refractive power; a fourth lens element with refractive power; and a fifth lens element with refractive power; wherein the image capturing optical system has a total of five lens elements with refractive power.

In the aforementioned image capturing optical system, every two lens elements of the first lens element, the second lens element, the third lens element, the fourth lens element and the fifth lens element have at least one air gap in between. Each of the first through fifth lens elements is a single and non-cemented lens element. That is, any two lens elements adjacent to each other are not cemented, and there is a space between the two lens elements. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to misalignment issues and it is thereby not favorable for the image quality of the image capturing optical system. Therefore, the image capturing optical system of the present disclosure provides five non-cemented lens elements for improving the problem generated by the cemented lens elements.

The first lens element has positive refractive power, so that it provides the optical system with the positive refractive power as it needs to be so as to reduce the total track length of the image capturing optical system. The first lens element has an object-side surface being convex in a paraxial region thereof so that it is favorable for adjusting the distribution of the positive refractive power and thereby reducing the total track length.

The second lens element has negative refractive power, so that it is favorable for correcting the aberration created by the first lens element. The second lens element has an object-side surface being concave in a paraxial region thereof so as to improve the aberration correction ability, and the image-side surface of the second lens element may have at least one convex shape in an off-axis region thereof to facilitate the correction of off-axis aberration.

The third lens element may have positive refractive power, which is favorable for reducing the spherical aberration so as to improve the image quality.

The fourth lens element has an object-side surface being convex in a paraxial region thereof and an image-side surface being concave in a paraxial region thereof so that the astigmatism can be favorably corrected to improve the image quality.

The fifth lens element may have negative refractive power so that the back focal length of the image capturing optical system can be favorably shortened and thereby to keep the image capturing optical system compact. The fifth lens element may have positive refractive power so that the sensitivity of the system can be favorably reduced. The fifth lens element has an object-side surface being convex in a paraxial region thereof and an image-side surface being concave in a paraxial region thereof so as to facilitate enhancing the correction of the astigmatism of the system. When at least one of the object-side surface and the image-side surface of the fifth lens element has at least one convex shape in an off-axis region thereof, the incident angle of the light projecting onto an image sensor from the off-axis field can be effectively suppressed to increase the receiving efficiency of the image sensor and thereby to further correct the aberration of the off-axis field.

When a focal length of the second lens element is f2, a focal length of the first lens element is f1 and the following condition is satisfied: $-1.0<f2/f1<0$, the second lens element has stronger negative refractive power so that the convergence of light effected by the positive refractive power of the first lens element can be balanced more effectively, thereby preventing drastic deviation of light and aberration. Preferably, the following condition is satisfied: of $-0.88<f2/f1<0$; more preferably, the following condition is satisfied: $-0.75<f2/f1<0$.

When a curvature radius of the object-side surface of the second lens element is R3, the focal length of the second lens element is f2, and the following condition is satisfied: 0<R3/f2, the aberration can be favorably corrected.

When an axial distance between the first lens element and the second lens element is T12; an axial distance between the second lens element and the third lens element is T23; an axial distance between the third lens element and the fourth lens element is T34; an axial distance between the fourth lens element and the fifth lens element is T45, and the following condition is satisfied: 0.25<T12/(T23+T34+T45), the distance between any two lens elements will be more appropriate, and this is favorable for assembling the system and keeping the system compact. Preferably, the condition of 0.60<T12/(T23+T34+T45)<4.0 is satisfied.

When an f-number of the image capturing optical system is Fno, and the following condition is satisfied: Fno<1.85, it is favorable for obtaining the advantages of large aperture and improving the peripheral illumination of the optical system.

When half of the maximal field of view of the image capturing optical system is HFOV, and the following condition is satisfied: 0<tan(HFOV)<0.45, it is favorable for the image capturing optical system to obtain a desirable field of view.

When a focal length of the image capturing optical system is f, a focal length of any one of the first lens element, the second lens element, the third lens element, the fourth lens element and the fifth lens element is fx (that is, x is 1, 2, 3, 4 or 5), and the following condition is satisfied: $6.0<\Sigma|f/fx|$, the distribution of the refractive power of the image capturing optical system is more balanced and thereby to facilitate reducing the sensitivity of the system.

When a central thickness of the first lens element is CT1; a central thickness of the second lens element is CT2; a central thickness of the third lens element is CT3, and the following condition is satisfied: 1.0<CT1/(CT2+CT3), the manufacturing yield rate can be favorably increased.

When the maximum index among the indexes of the first lens element, the second lens element, the third lens element, the fourth lens element and the fifth lens element is Nmax, and the following condition is satisfied: 1.50<Nmax<1.75, it is favorable for properly selecting the materials for the lens elements so that the design of the system can be more flexible.

When an effective radius of the object-side surface of the first lens element is SD11, an effective radius of the image-side surface of the fifth lens element is SD52, and the following condition is satisfied: 1.0<SD11/SD52<1.6, the off-axis field aberration correction can be favorably enhanced.

When the image capturing optical system can further comprise a prism disposed between the image-side surface of the fifth lens element and an image surface, the prism can be used to change the optical path and thereby to meet the design requirements for compact electronic devices.

When the focal length of the second lens element is f2, the focal length of any one of the first lens element, the third lens element, the fourth lens element and the fifth lens element is fy, that is, y is 1, 3, 4 or 5, and the following condition is satisfied: |f2|<|fy|, the refractive power of the second lens element is more appropriate so as to balance the distribution of the refractive power of the system and to provide greater aberration corrections.

When the image capturing optical system can further comprise an image surface, a curvature radius of the image surface is Rimg, and the following condition is satisfied: −500 [mm] <Rimg<−20 [mm], the field of curvature can be effectively corrected to significantly increase the accuracy of focusing.

When a focal length of the fourth lens element is f4, a curvature radius of the image-side surface of the third lens element is R6 and the following condition is satisfied: −0.5<f4/R6<2.0, the astigmatism and spherical aberrations can be reduced.

According to the image capturing optical system of the present disclosure, the lens elements thereof can be made of glass or plastic material. When the lens elements are made of glass material, the distribution of the refractive power of the image capturing optical system may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical surfaces so as to have more controllable variables for eliminating the aberration thereof, and to further decrease the required number of the lens elements. Therefore, the total track length of the image capturing optical system can be reduced.

According to the image capturing optical system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Likewise, when the region of refractive power or focus of a lens element is not defined, it indicates that the region of refractive power or focus of the lens element is in the paraxial region thereof.

According to the image capturing optical system of the present disclosure, an image surface of the image capturing optical system, based on the corresponding image sensor, can be flat or curved, especially a curved surface being concave facing towards the object side of the optical imaging system.

According to the image capturing optical system of the present disclosure, the image capturing optical system can include at least one stop, such as an aperture stop, a glare stop or a field stop. Said glare stop or said field stop is for eliminating the stray light and thereby improving the image resolution thereof.

According to the image capturing optical system of the present disclosure, an aperture stop can be configured as a front stop or a middle stop. A front stop disposed between an imaged object and the first lens element can provide a longer distance between an exit pupil of the image capturing optical system and the image surface and thereby improves the image-sensing efficiency of an image sensor. A middle stop disposed between the first lens element and the image surface is favorable for enlarging the field of view of the image capturing optical system and thereby provides a wider field of view for the same.

The present image capturing optical system can be optionally applied to moving focus optical systems. According to the image capturing optical system of the present disclosure, the image capturing optical system is featured with good correction ability and high image quality, and can be applied to 3D (three-dimensional) image capturing applications, in products such as digital cameras, mobile devices, digital tablets, smart TV, wireless monitoring device, motion sensing input device, driving recording system, rear view camera system, wearable devices and other electronic devices.

According to the present disclosure, an image capturing device is provided. The image capturing device includes the image capturing optical system according to the aforementioned image capturing optical system of the present disclosure, and an image sensor, wherein the image sensor is disposed on an image surface of the aforementioned image capturing optical system. As a result, it is favorable for improving the resolving power and illumination so as to achieve the best image quality. Preferably, the image capturing device can further include a barrel member, a holding member or a combination thereof.

Figure 11A:
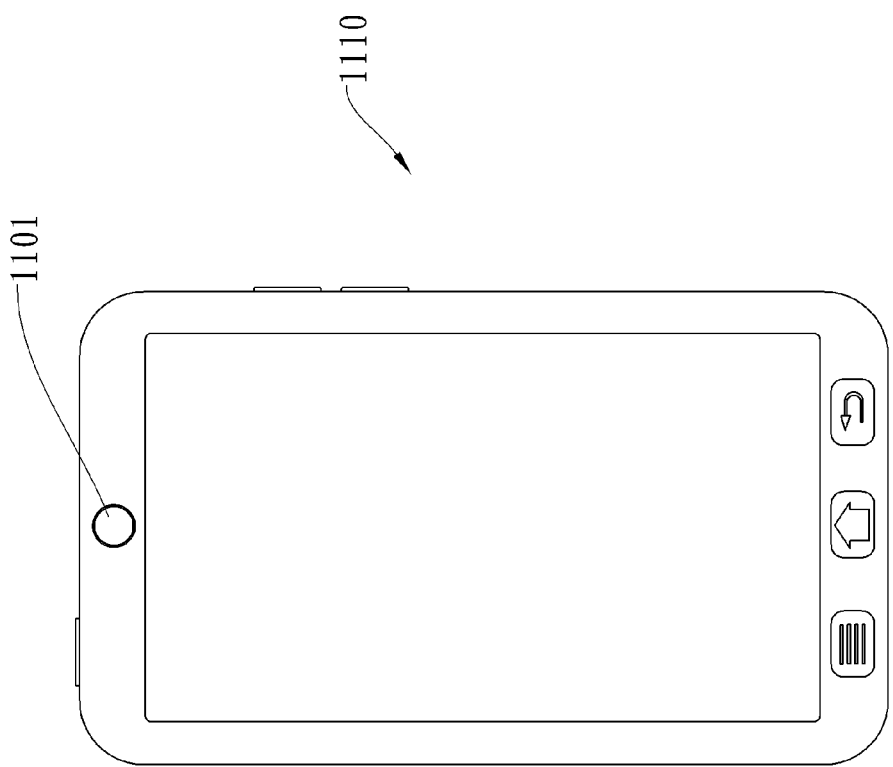
FIG. 11A shows a smart phone with an image capturing device of the present disclosure installed therein.
Figure 11B:
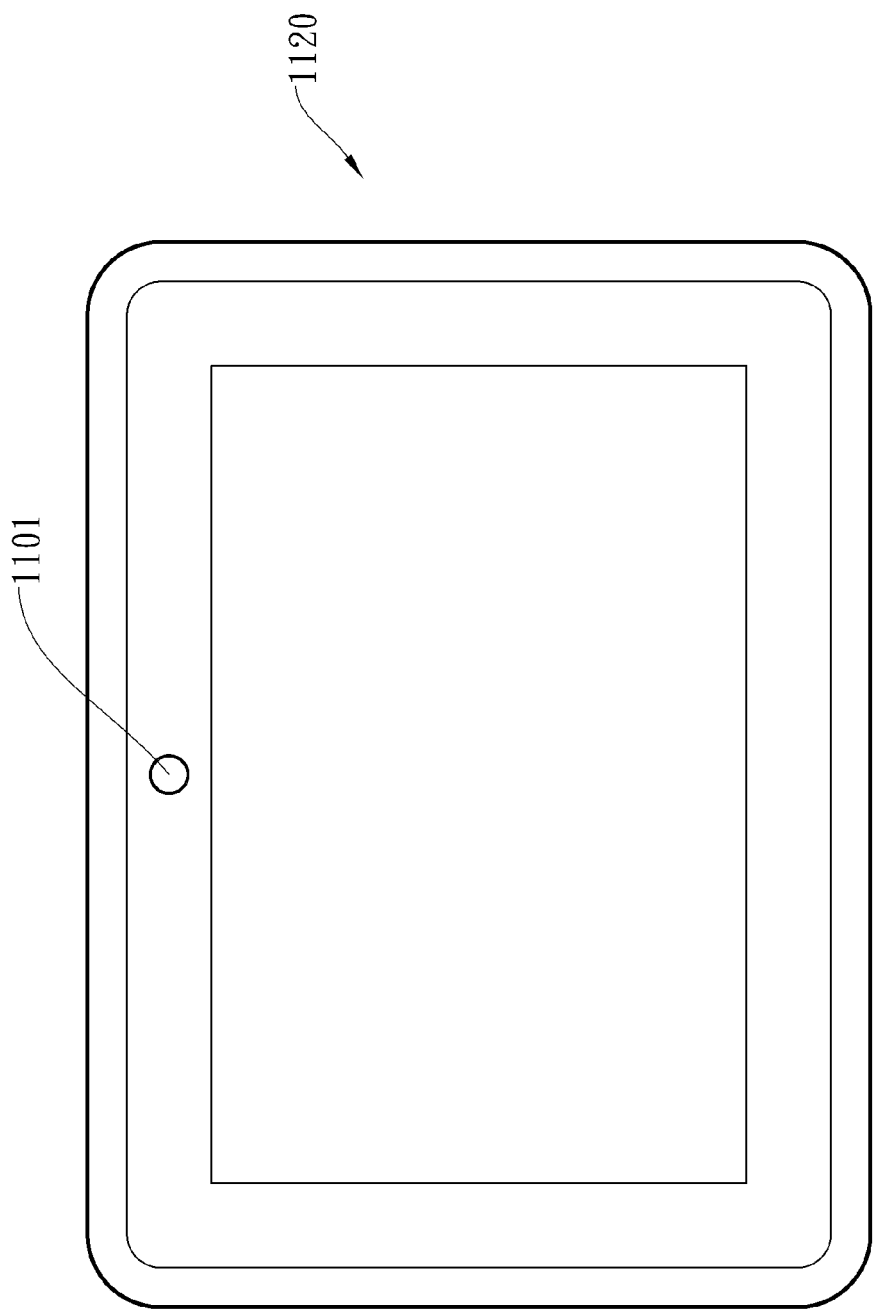
FIG. 11B shows a tablet personal computer with an image capturing device of the present disclosure installed therein.
Figure 11C:
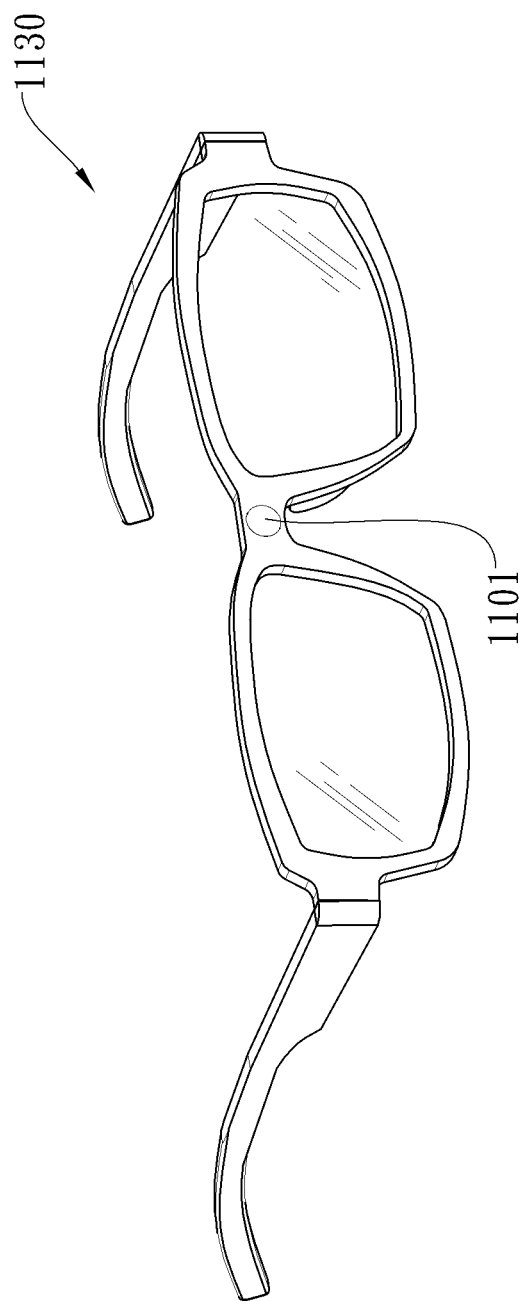
FIG. 11C shows a wearable device with an image capturing device of the present disclosure installed therein.

In FIG. 11A, FIG. 11B and FIG. 11C, an image capturing device 1101 may be installed in but not limited to an electronic device, including a smart phone 1110, a tablet personal computer 1120 or a wearable device 1130. The three exemplary figures of different kinds of electronic device are only exemplary for showing the image capturing device of present disclosure installing in an electronic device and is not limited thereto. Preferably, the electronic device can further include but not limited to display, control unit, random access memory unit (RAM) a read only memory unit (ROM) or a combination thereof.

According to the above description of the present disclosure, the following 1st-10th specific embodiments are provided for further explanation.

1st Embodiment

Figure 1B:
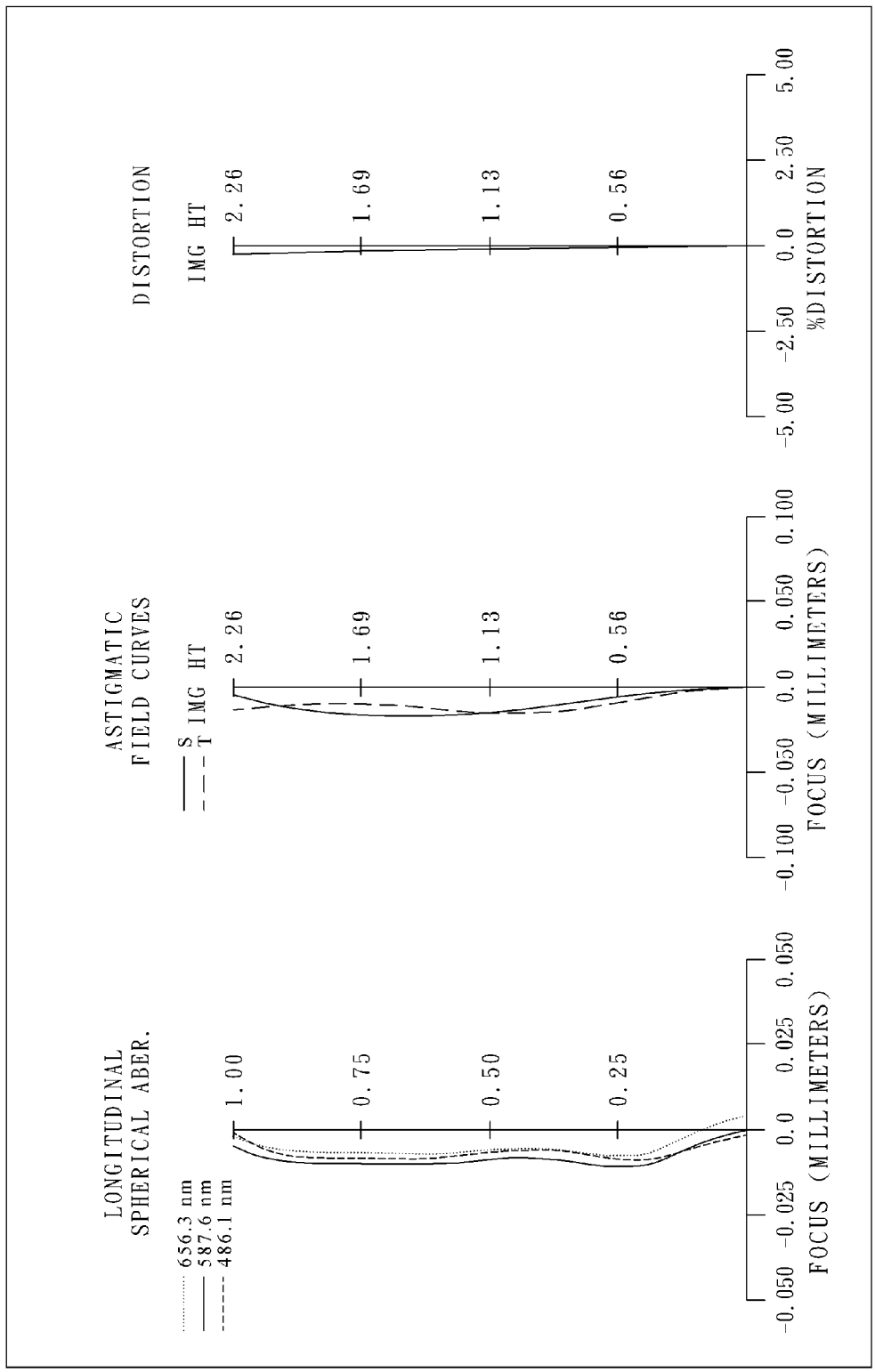
FIG. 1B shows spherical aberration curves, astigmatic field curves and a distortion curve of the image capturing device according to the 1st embodiment.

FIG. 1A is a schematic view of an image capturing device according to the 1st embodiment of the present disclosure. FIG. 1B shows, in order from left to right, spherical aberration curves, astigmatic field curves and a distortion curve of the image capturing device according to the 1st embodiment.

In FIG. 1A, the image capturing device includes the image capturing optical system (not otherwise herein labeled) of the present disclosure and an image sensor 190. The image capturing optical system includes, in order from an object side to an image side, a first lens element 110, an aperture stop 100, a second lens element 120, a third lens element 130, a fourth lens element 140, a fifth lens element 150, a prism 160 and an image surface 180, wherein the image capturing optical system has a total of five lens elements (110-150) with refractive power, which are non-cemented lens element.

The first lens element 110 with positive refractive power has an object-side surface 111 being convex in a paraxial region thereof and an image-side surface 112 being concave in a paraxial region thereof, which are both aspheric, the first lens element 110 is made of plastic material.

The second lens element 120 with negative refractive power has an object-side surface 121 being concave in a paraxial region thereof and an image-side surface 122 being convex in a paraxial region thereof, which are both aspheric, the second lens element 120 is made of plastic material, and the image-side surface 122 has at least one convex shape in an off-axis region thereof.

The third lens element 130 with positive refractive power has an object-side surface 131 being concave in a paraxial region thereof and an image-side surface 132 being convex in a paraxial region thereof, which are both aspheric, and the third lens element 130 is made of plastic material.

The fourth lens element 140 with negative refractive power has an object-side surface 141 being convex in a paraxial region thereof and an image-side surface 142 being concave in a paraxial region thereof, which are both aspheric, and the fourth lens element 140 is made of plastic material.

The fifth lens element 150 with positive refractive power has an object-side surface 151 being convex in a paraxial region thereof and an image-side surface 152 being concave in a paraxial region thereof, which are both aspheric, the fifth lens element 150 is made of plastic material and the object-side surface 151 having at least one convex shape in an off-axis region thereof.

The prism 160 is made of glass and located between the fifth lens element 150 and the image surface 180, and will not affect the focal length of the image capturing optical system. The image sensor 190 is disposed on or near the image surface 180 of the image capturing optical system.

The equation of the aspheric surface profiles is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the first embodiment, a focal length of the image capturing optical system is f, an f-number of the image capturing optical system is Fno, half of a maximal field of view of the image capturing optical system is HFOV, and these parameters have the following values: f=9.65 mm; Fno=1.56; and HFOV=13.2 degrees.

In the first embodiment, half of a maximal field of view of the image capturing optical system is HFOV, and it satisfies the condition: tan(HFOV)=0.23.

In the first embodiment, the maximum index among the indexes of the first lens element 110, the second lens element 120, the third lens element 130, the fourth lens element 140 and the fifth lens element 150 is Nmax, and it satisfies the condition: Nmax=1.650.

In the first embodiment, a central thickness of the first lens element 110 is CT1, a central thickness of the second lens element 120 is CT2, a central thickness of the third lens element 130 is CT3, and they satisfy the condition:

$$CT1/(CT2+CT3)=1.41.$$

In the first embodiment, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and they satisfy the condition: T12/(T23+T34+T45)=1.83.

In the first embodiment, a curvature radius of the object-side surface 121 of the second lens element 120 is R3, a focal length of the second lens element 120 is f2, and they satisfy the condition: R3/f2=0.30.

In the first embodiment, the focal length of the second lens element 120 is f2, a focal length of the first lens element 110 is f1, and they satisfy the condition: f2/f1=−0.85.

In the first embodiment, a focal length of the fourth lens element 140 is f4, a curvature radius of the image-side surface 132 of the third lens element 130 is R6, and they satisfy the condition: f4/R6=1.52.

In the first embodiment, the focal length of the image capturing optical system is f, the focal length of any one of the first lens element 110, the second lens element 120, the third lens element 130, the fourth lens element 140 and the fifth lens element 150 is fx, that is, x is 1, 2, 3, 4 or 5, and they satisfy the condition: Σ|f/fx|=8.23.

In the first embodiment, a curvature radius of the image surface 180 is Rimg, and it satisfies the condition: Rimg=∞.

In the first embodiment, an effective radius of the object-side surface 111 of the first lens element 110 is SD11, an effective radius of the image-side surface 152 of the fifth lens element 150 is SD52, and they satisfy the condition: SD11/SD52=1.30.

The detailed optical data of the first embodiment is shown in TABLE 1, and the aspheric surface data is shown in TABLE 2, wherein the units of the curvature radius, the thickness and the focal length are expressed in mm, and HFOV is half of the maximal field of view.

TABLE 1

(Embodiment 1)
f = 9.65 mm, Fno = 1.56, HFOV = 13.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.467 | ASP | 1.746 | Plastic | 1.544 | 55.9 | 14.21 |
| 2 | | 16.567 | ASP | 0.051 | | | | |
| 3 | Stop | Plano | | 1.279 | | | | |
| 4 | Lens 2 | −3.648 | ASP | 0.500 | Plastic | 1.650 | 21.5 | −12.02 |
| 5 | | −7.210 | ASP | 0.456 | | | | |
| 6 | Lens 3 | −4.956 | ASP | 0.737 | Plastic | 1.650 | 21.5 | 5.92 |
| 7 | | −2.294 | ASP | 0.125 | | | | |
| 8 | Lens 4 | 4.820 | ASP | 1.201 | Plastic | 1.650 | 21.5 | −3.49 |
| 9 | | 1.392 | ASP | 0.146 | | | | |
| 10 | Lens 5 | 1.855 | ASP | 1.860 | Plastic | 1.535 | 56.3 | 4.10 |
| 11 | | 7.834 | ASP | 1.000 | | | | |
| 12 | Prism | Plano | | 4.000 | Glass | 2.003 | 28.3 | — |
| 13 | | Plano | | 1.824 | | | | |
| 14 | Image Surface | Plano | | — | | | | |

Note:
Reference Wavelength is d-line 587.6 nm

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
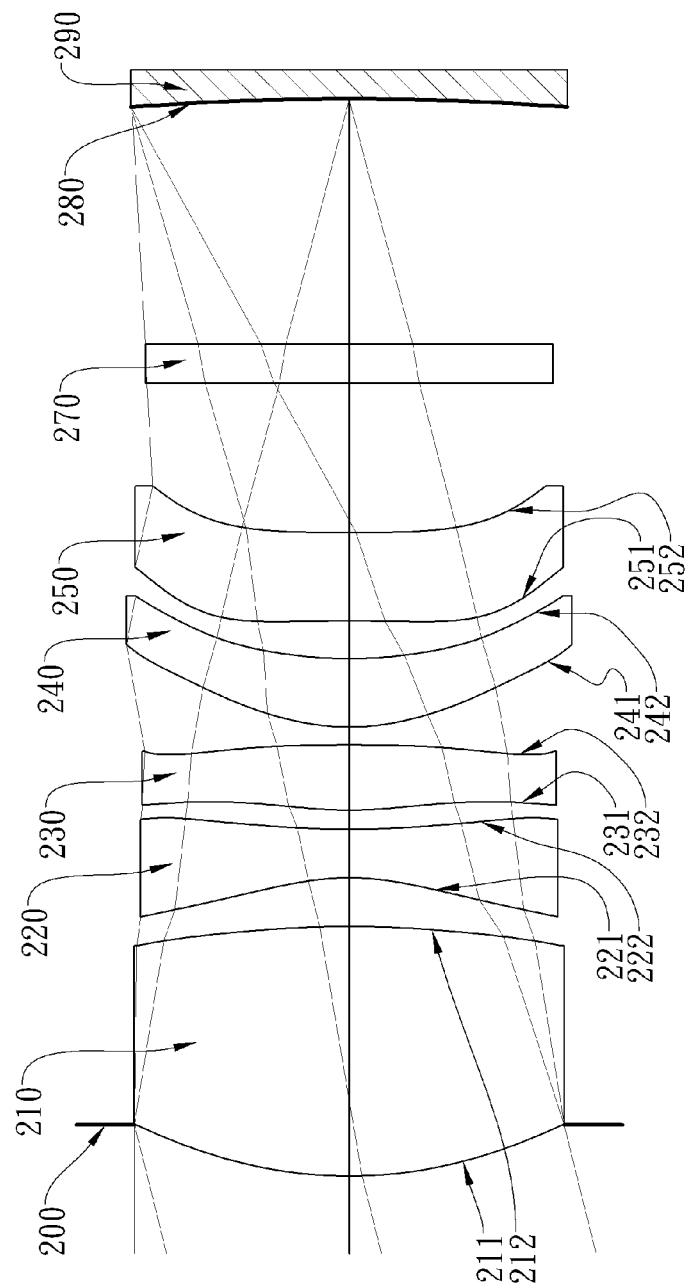
FIG. 2A is a schematic view of an image capturing device according to the 2nd embodiment of the present disclosure.
Figure 2B:
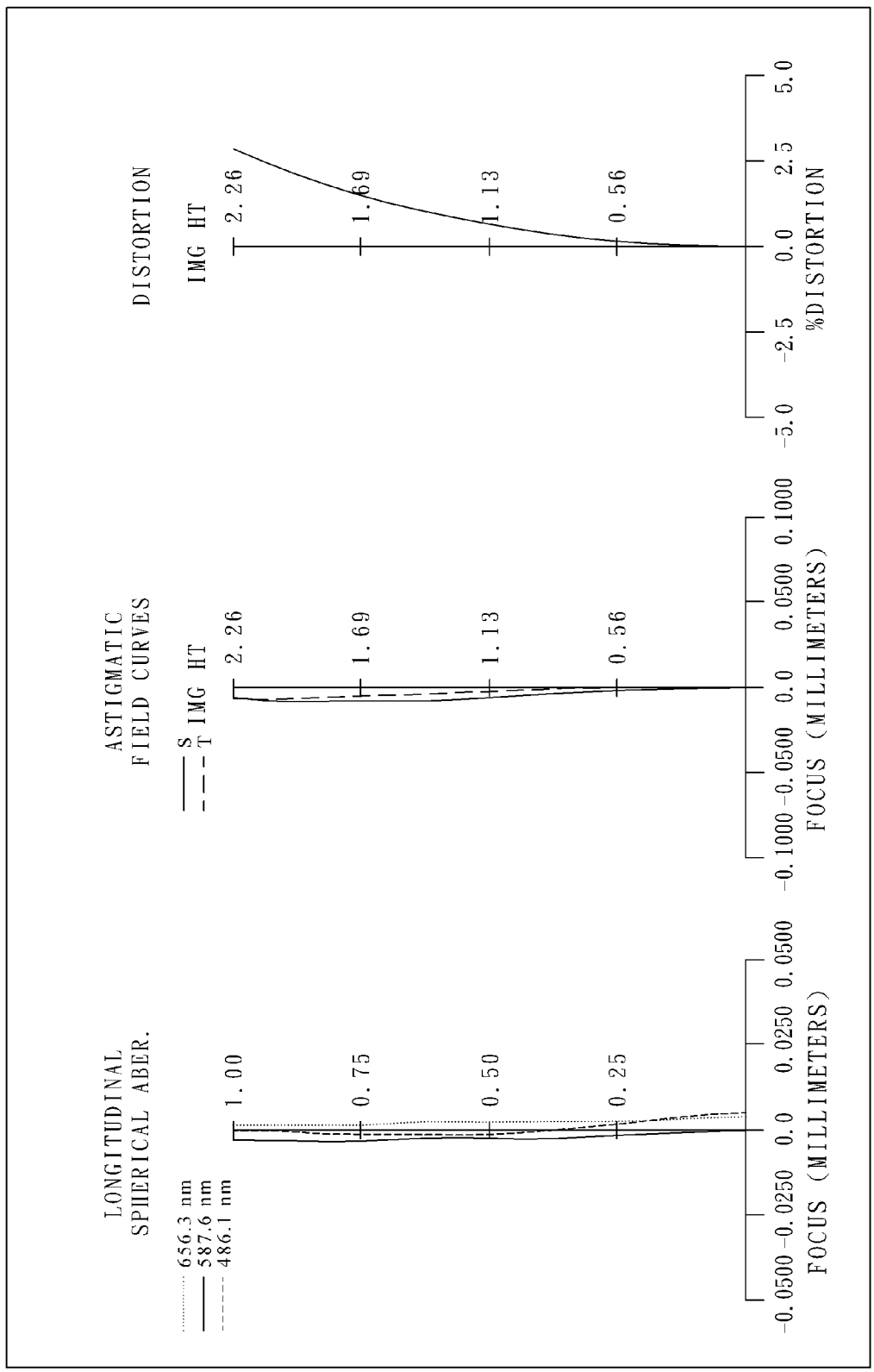
FIG. 2B shows spherical aberration curves, astigmatic field curves and a distortion curve of the image capturing device according to the 2nd embodiment.

FIG. 2A is a schematic view of an image capturing device according to the 2nd embodiment of the present disclosure. FIG. 2B shows, in order from left to right, spherical aberration curves, astigmatic field curves and a distortion curve of the image capturing device according to the 2nd embodiment.

In FIG. 2A, the image capturing device includes the image capturing optical system (not otherwise herein labeled) of the present disclosure and an image sensor 290. The image capturing optical system includes, in order from an object side to an image side, an aperture stop 200, a first lens element 210, a second lens element 220, a third lens element 230, a fourth lens element 240, a fifth lens element 250, an IR-cut filter 270, and an image surface 280, wherein the image capturing optical system has a total of five lens elements (210-250) with refractive power, which are non-cemented lens element.

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being concave in a paraxial region thereof and an image-side surface 222 being concave in a paraxial region thereof, which are both aspheric, the second lens element 220 is made of plastic material, and the image-side surface 222 has at least one convex shape in an off-axis region thereof.

TABLE 2

Aspheric Coefficients

| Surface # | 1 | 2 | 4 | 5 | 6 |
|---|---|---|---|---|---|
| k = | −2.8042E+00 | −4.7069E+01 | −2.6572E+00 | 9.8435E−01 | −3.5805E+00 |
| A4 = | 1.5304E−03 | 8.0598E−04 | 9.8554E−03 | 3.0832E−03 | −1.9891E−02 |
| A6 = | −8.9542E−05 | −1.4511E−04 | −2.4941E−03 | −1.7015E−03 | 5.0880E−03 |
| A8 = | −6.7025E−06 | −2.6261E−05 | 3.3016E−04 | 1.7285E−04 | −7.3257E−04 |
| A10 = | −3.0587E−07 | 1.9556E−07 | −3.3256E−05 | 1.4625E−06 | 8.2342E−05 |
| A12 = | −2.7294E−08 | 6.3086E−08 | 2.0053E−06 | −1.1317E−06 | −5.6132E−06 |
| A14 = | | | −4.6175E−08 | 5.1055E−08 | 1.6014E−07 |

| Surface # | 7 | 8 | 9 | 10 | 11 |
|---|---|---|---|---|---|
| k = | −5.3871E+00 | −1.0392E+00 | −3.3750E+00 | −2.4268E+00 | −4.8592E−01 |
| A4 = | −1.2811E−02 | 9.3585E−03 | 1.0305E−02 | −1.1912E−02 | 3.8325E−03 |
| A6 = | 3.1927E−03 | −2.0401E−03 | 4.4585E−03 | 1.5311E−02 | −8.7642E−04 |
| A8 = | −2.8890E−04 | 1.4093E−04 | −2.4466E−03 | −6.1542E−03 | 1.3984E−04 |
| A10 = | 7.6028E−06 | −3.1965E−06 | 4.4169E−04 | 1.4040E−03 | 9.5682E−05 |
| A12 = | 1.5699E−06 | 1.9340E−07 | −2.4383E−05 | −1.8755E−04 | −4.8338E−05 |
| A14 = | −1.8680E−07 | −3.8218E−08 | −1.8018E−06 | 1.4054E−05 | 9.1339E−06 |
| A16 = | 6.1799E−09 | | 1.7674E−07 | −4.6920E−07 | −5.9032E−07 |

The third lens element 230 with positive refractive power has an object-side surface 231 being convex in a paraxial region thereof and an image-side surface 232 being convex in a paraxial region thereof, which are both aspheric, and the third lens element 230 is made of plastic material.

The fourth lens element 240 with positive refractive power has an object-side surface 241 being convex in a paraxial region thereof and an image-side surface 242 being concave in a paraxial region thereof, which are both aspheric, and the fourth lens element 240 is made of plastic material.

The fifth lens element 250 with negative refractive power has an object-side surface 251 being concave in a paraxial region thereof and an image-side surface 252 being concave in a paraxial region thereof, which are both aspheric, the fifth lens element 250 is made of plastic material, and both of the object-side surface 251 and the image-side surface 252 have at least one convex shape in an off-axis region thereof.

The IR-cut filter 270 is made of glass and located between the fifth lens element 250 and the image surface 280, and will not affect the focal length of the image capturing optical system. The image sensor 290 is disposed on or near the image surface 280 of the image capturing optical system.

The detailed optical data of the second embodiment is shown in TABLE 3, and the aspheric surface data is shown in TABLE 4, wherein the units of the curvature radius, the thickness and the focal length are expressed in mm, and HFOV is half of the maximal field of view.

TABLE 3

(Embodiment 2)
f = 8.88 mm, Fno = 2.00, HFOV = 14.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.530 | | | | |
| 2 | Lens 1 | 4.549 | ASP | 2.583 | Plastic | 1.544 | 55.9 | 6.05 |
| 3 | | −9.559 | ASP | 0.504 | | | | |
| 4 | Lens 2 | −2.484 | ASP | 0.500 | Plastic | 1.639 | 23.5 | −2.88 |
| 5 | | 7.685 | ASP | 0.200 | | | | |
| 6 | Lens 3 | 4.107 | ASP | 0.674 | Plastic | 1.639 | 23.5 | 5.86 |
| 7 | | −39.659 | ASP | 0.185 | | | | |
| 8 | Lens 4 | 2.303 | ASP | 0.708 | Plastic | 1.544 | 55.9 | 8.27 |
| 9 | | 4.208 | ASP | 0.391 | | | | |
| 10 | Lens 5 | −20.975 | ASP | 0.913 | Plastic | 1.544 | 55.9 | −22.04 |
| 11 | | 28.436 | ASP | 1.549 | | | | |
| 12 | IR-cut filter | Plano | | 0.400 | Glass | 1.517 | 64.2 | — |
| 13 | | Plano | | 2.541 | | | | |
| 14 | Image Surface | −30.000000 | | — | | | | |

Note:
Reference wavelength is d-line 587.6 nm

TABLE 4

| Aspheric Coefficients | | | | | |
|---|---|---|---|---|---|
| Surface # | 2 | 3 | 4 | 5 | 6 |
| k = | −1.1584E+00 | −4.3570E+01 | −8.9586E+00 | 2.5013E+00 | 1.1842E+00 |
| A4 = | 6.3572E−04 | 4.8378E−03 | 1.6859E−02 | −2.1090E−02 | −6.9882E−02 |
| A6 = | −4.4595E−05 | −3.1230E−03 | −9.2693E−03 | 5.8186E−03 | 1.6939E−02 |
| A8 = | −3.2254E−05 | 6.8669E−04 | 4.2304E−03 | −4.9787E−04 | −2.0971E−03 |
| A10 = | 7.5913E−06 | −2.1563E−05 | −1.2293E−03 | −4.2278E−05 | 2.2031E−05 |
| A12 = | −1.0427E−06 | −1.7377E−05 | 2.1927E−04 | −1.4353E−05 | 8.0748E−06 |
| A14 = | 4.6052E−08 | 2.0265E−03 | −2.3958E−05 | 1.5481E−07 | −1.5049E−06 |
| A16 = | | | 1.2843E−06 | 5.0453E−07 | 4.0675E−07 |
| Surface # | 7 | 8 | 9 | 10 | 11 |
| k = | −5.0000E+01 | −6.1392E+00 | −1.5701E+01 | −1.5378E+01 | 3.0000E+00 |
| A4 = | −2.7275E−02 | 6.5688E−03 | −1.1786E−03 | 9.1669E−03 | 2.0443E−02 |
| A6 = | 1.4484E−02 | 9.8039E−03 | 1.4359E−02 | 1.8322E−02 | 4.4605E−03 |
| A8 = | −5.1390E−03 | −6.7248E−03 | −6.6193E−03 | −9.0951E−03 | −2.2675E−03 |
| A10 = | 1.4877E−03 | 2.2586E−03 | 3.0376E−03 | 3.8962E−03 | 5.8146E−04 |
| A12 = | −2.9738E−04 | −5.3074E−04 | −1.0896E−03 | −1.1432E−03 | −4.3937E−05 |
| A14 = | 3.5128E−05 | 7.6999E−05 | 1.9747E−04 | 1.7691E−04 | −3.8702E−06 |
| A16 = | −1.5322E−06 | −4.6150E−06 | −1.3375E−05 | −1.0977E−05 | 7.2252E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.88 | R3/f2 | 0.86 |
| Fno | 2.00 | f2/f1 | −0.48 |
| HFOV [deg.] | 14.0 | f4/R6 | −0.21 |
| tan(HFOV) | 0.25 | Σ\|f/fx\| | 7.54 |
| Nmax | 1.639 | Rimg [mm] | −30.00 |
| CT1/(CT2 + CT3) | 2.20 | SD11/SD52 | 1.09 |
| T12/(T23 + T34 + T45) | 0.65 | | |

3rd Embodiment

Figure 3A:
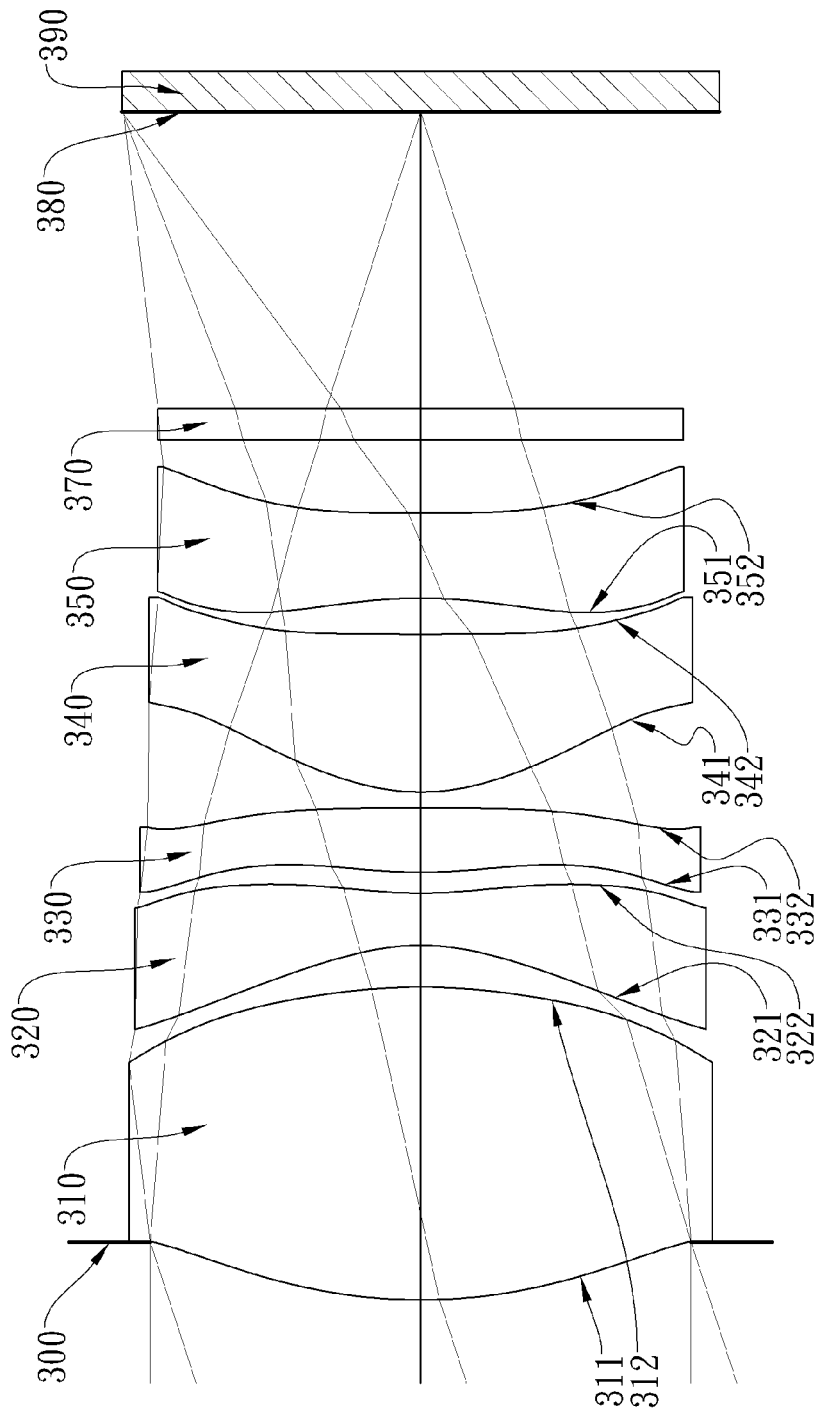
FIG. 3A is a schematic view of an image capturing device according to the 3rd embodiment of the present disclosure.
Figure 3B:
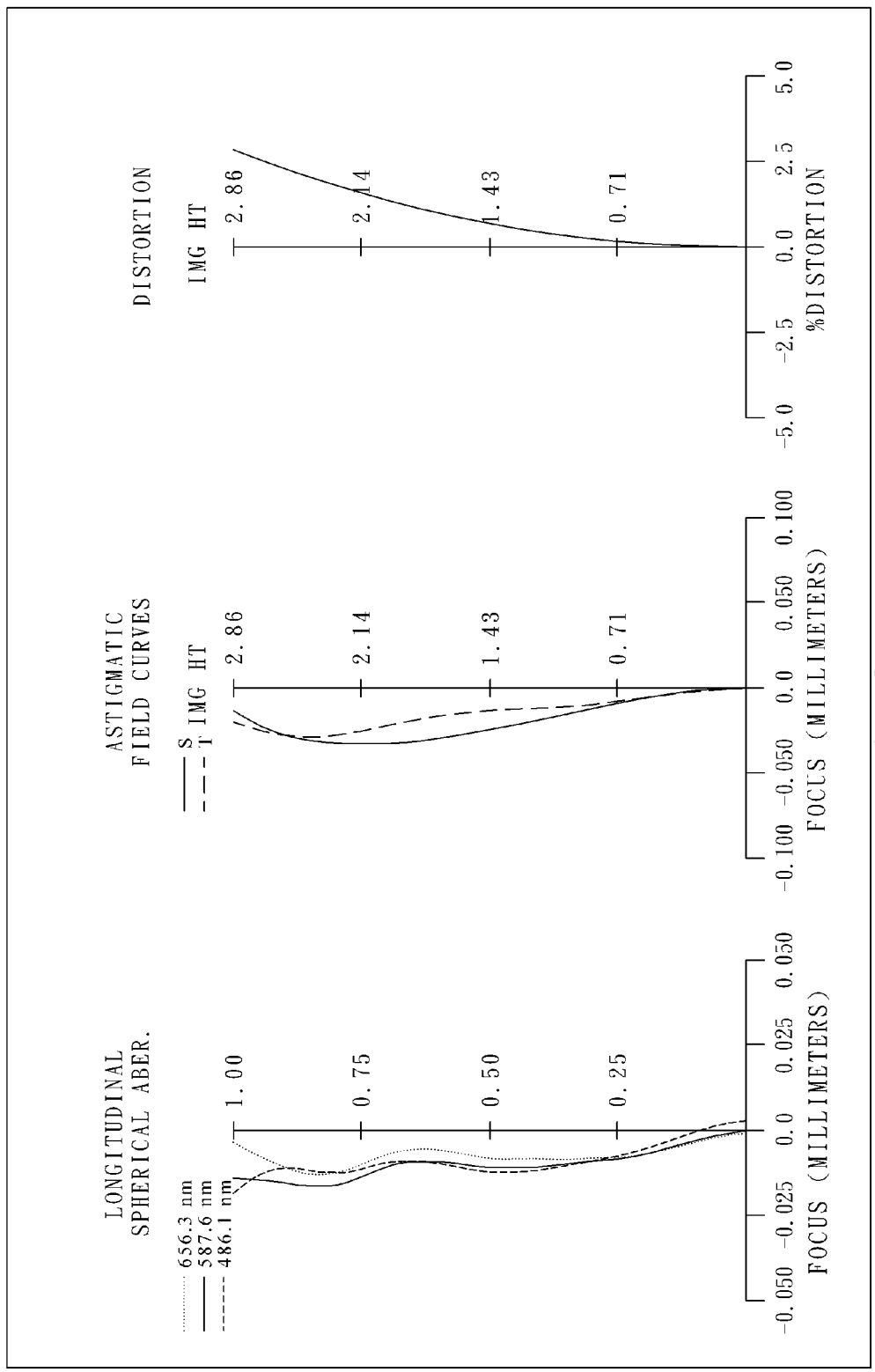
FIG. 3B shows spherical aberration curves, astigmatic field curves and a distortion curve of the image capturing device according to the 3rd embodiment.

FIG. 3A is a schematic view of an image capturing device according to the 3rd embodiment of the present disclosure. FIG. 3B shows, in order from left to right, spherical aberration curves, astigmatic field curves and a distortion curve of the image capturing device according to the 3rd embodiment.

In FIG. 3A, the image capturing device includes the image capturing optical system (not otherwise herein labeled) of the present disclosure and an image sensor 390. The image capturing optical system includes, in order from an object side to an image side, an aperture stop 300, a first lens element 310, a second lens element 320, a third lens element 330, a fourth lens element 340, a fifth lens element 350, an IR-cut filter 370, and an image surface 380, wherein the image capturing optical system has a total of five lens elements (310-350) with refractive power, which are non-cemented lens element.

The first lens element 310 with positive refractive power has an object-side surface 311 being convex in a paraxial region thereof and an image-side surface 312 being convex in a paraxial region thereof, which are both aspheric, the first lens element 310 is made of plastic material.

The second lens element 320 with negative refractive power has an object-side surface 321 being concave in a paraxial region thereof and an image-side surface 322 being concave in a paraxial region thereof, which are both aspheric, the second lens element 320 is made of plastic material, and the image-side surface 322 having at least one convex shape in an off-axis region thereof.

The third lens element 330 with positive refractive power has an object-side surface 331 being convex in a paraxial region thereof and an image-side surface 332 being concave in a paraxial region thereof, which are both aspheric, and the third lens element 330 is made of plastic material.

The fourth lens element 340 with positive refractive power has an object-side surface 341 being convex in a paraxial region thereof and an image-side surface 342 being concave in a paraxial region thereof, which are both aspheric, and the fourth lens element 340 is made of plastic material.

The fifth lens element 350 with negative refractive power has an object-side surface 351 being concave in a paraxial region thereof and an image-side surface 352 being concave in a paraxial region thereof, which are both aspheric, the fifth lens element 350 is made of plastic material, and both of the object-side surface 351 and the image-side surface 352 have at least one convex shape in an off-axis region thereof.

The IR-cut filter 370 is made of glass and located between the fifth lens element 350 and the image surface 380, and will not affect the focal length of the image capturing optical system. The image sensor 390 is disposed on or near the image surface 380 of the image capturing optical system.

The detailed optical data of the third embodiment is shown in TABLE 5, and the aspheric surface data is shown in TABLE 6, wherein the units of the curvature radius, the thickness and the focal length are expressed in mm, and HFOV is half of the maximal field of view.

TABLE 5

(Embodiment 3)
f = 8.55 mm, Fno = 1.65, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.552 | | | | |
| 2 | Lens 1 | 5.069 | ASP | 3.000 | Plastic | 1.544 | 55.9 | 5.28 |
| 3 | | −5.246 | ASP | 0.400 | | | | |
| 4 | Lens 2 | −2.152 | ASP | 0.500 | Plastic | 1.607 | 26.6 | −2.25 |
| 5 | | 4.091 | ASP | 0.200 | | | | |
| 6 | Lens 3 | 4.631 | ASP | 0.613 | Plastic | 1.650 | 21.4 | 7.52 |
| 7 | | 83.211 | ASP | 0.156 | | | | |
| 8 | Lens 4 | 1.971 | ASP | 1.513 | Plastic | 1.544 | 55.9 | 3.67 |
| 9 | | 118.721 | ASP | 0.347 | | | | |
| 10 | Lens 5 | −4.600 | ASP | 0.814 | Plastic | 1.544 | 55.9 | −7.33 |
| 11 | | 31.924 | ASP | 0.703 | | | | |
| 12 | IR-cut filter | Plano | | 0.300 | Glass | 1.517 | 64.2 | — |
| 13 | | Plano | | 2.847 | | | | |
| 14 | Image Surface | Plano | | — | | | | |

Note:
Reference wavelength is d-line 587.6 nm

TABLE 6

Aspheric Coefficients

| Surface# | 2 | 3 | 4 | 5 | 6 |
|---|---|---|---|---|---|
| k = | −1.3585E+00 | −2.7767E+01 | −4.8579E+00 | −3.3016E+01 | −7.7355E−01 |
| A4 = | 1.4218E−04 | −7.2498E−04 | 1.3121E−02 | −2.6116E−02 | −5.2539E−02 |
| A6 = | −1.6306E−04 | −2.2655E−03 | −7.1197E−03 | 5.6094E−03 | 9.8318E−03 |
| A8 = | −1.8191E−05 | 3.1377E−04 | 2.3747E−03 | −4.9389E−04 | −1.0851E−03 |
| A10 = | 2.0653E−06 | −2.0134E−06 | −5.1470E−04 | −2.5719E−05 | 1.1517E−05 |
| A12 = | −4.3682E−07 | −2.6454E−06 | 7.2456E−05 | 1.2238E−06 | 5.3802E−06 |
| A14 = | 8.8272E−09 | 1.5190E−07 | −5.8702E−06 | 7.8554E−07 | 4.4894E−07 |
| A16 = | | | 2.0401E−07 | −5.0865E−08 | −6.0659E−08 |

| Surface# | 7 | 8 | 9 | 10 | 11 |
|---|---|---|---|---|---|
| k = | −5.0000E+01 | −4.6890E+00 | −2.0000E+01 | −9.1180E+00 | −2.0000E+01 |
| A4 = | −2.1894E−02 | 7.2604E−03 | 5.6113E−03 | 9.2445E−03 | 2.0017E−02 |

TABLE 6-continued

| Aspheric Coefficients | | | | |
|---|---|---|---|---|
| A6 =  | 7.6650E−03 | 2.8813E−03 | 4.4644E−03 | 5.9422E−03 | −1.3504E−03 |
| A8 =  | −2.7259E−03 | −2.6818E−03 | −2.6350E−03 | −3.9193E−03 | −3.5177E−04 |
| A10 = | 6.7769E−04 | 9.3204E−04 | 1.2824E−03 | 1.6956E−03 | 6.5017E−05 |
| A12 = | −1.0210E−04 | −1.9913E−04 | −3.7993E−04 | −4.1985E−04 | 5.1341E−06 |
| A14 = | 8.7551E−06 | 2.2273E−05 | 5.3812E−05 | 5.2563E−05 | −2.1823E−06 |
| A16 = | −3.1472E−07 | −9.6382E−07 | −2.8329E−06 | −2.5861E−06 | 1.4170E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 8.55 | R3/f2 | 0.96 |
| Fno | 1.65 | f2/f1 | −0.43 |
| HFOV [deg.] | 18.0 | f4/R6 | 0.04 |
| tan(HFOV) | 0.32 | Σ|f/fx| | 10.05 |
| Nmax | 1.650 | Rimg [mm] | ∞ |
| CT1/(CT2 + CT3) | 2.70 | SD11/SD52 | 1.05 |
| T12/(T23 + T34 + T45) | 0.57 | | |

4th Embodiment

Figure 4A:
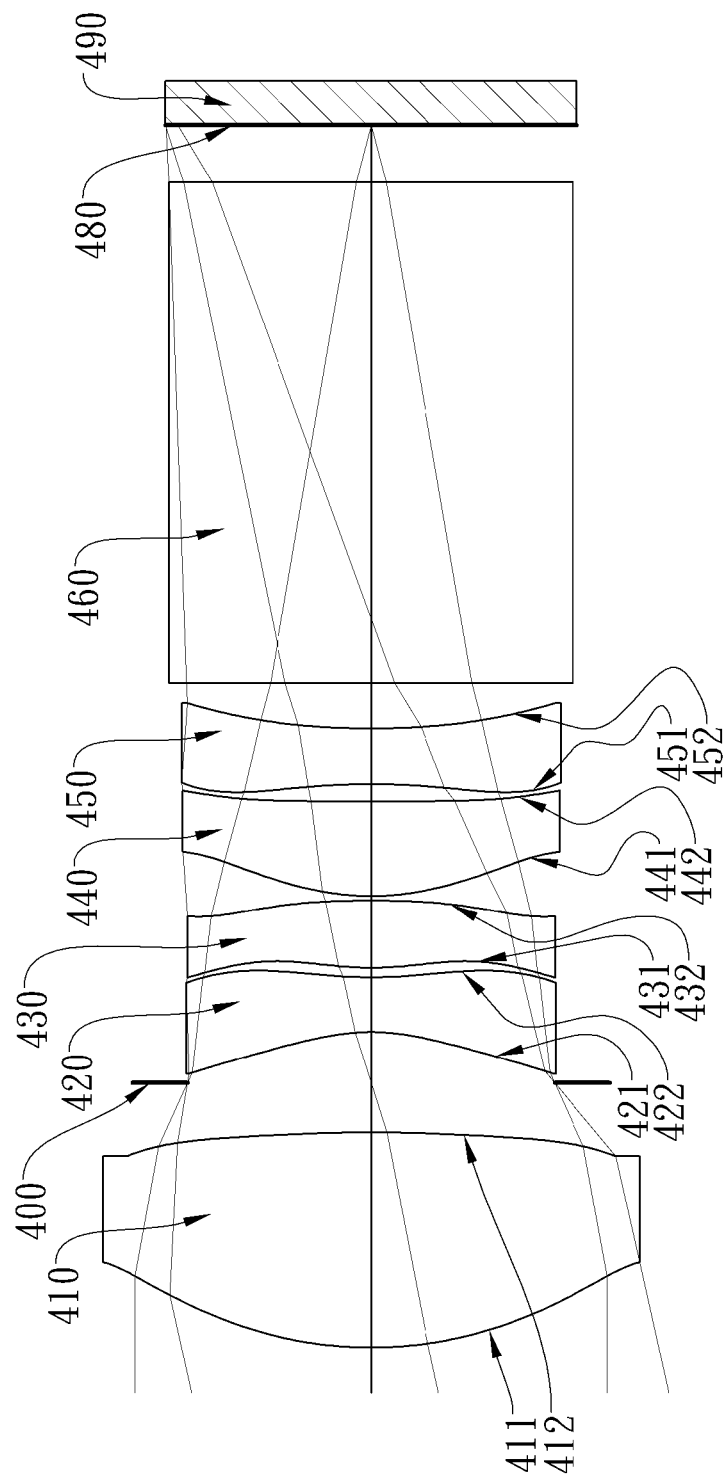
FIG. 4A is a schematic view of an image capturing device according to the 4th embodiment of the present disclosure.
Figure 4B:
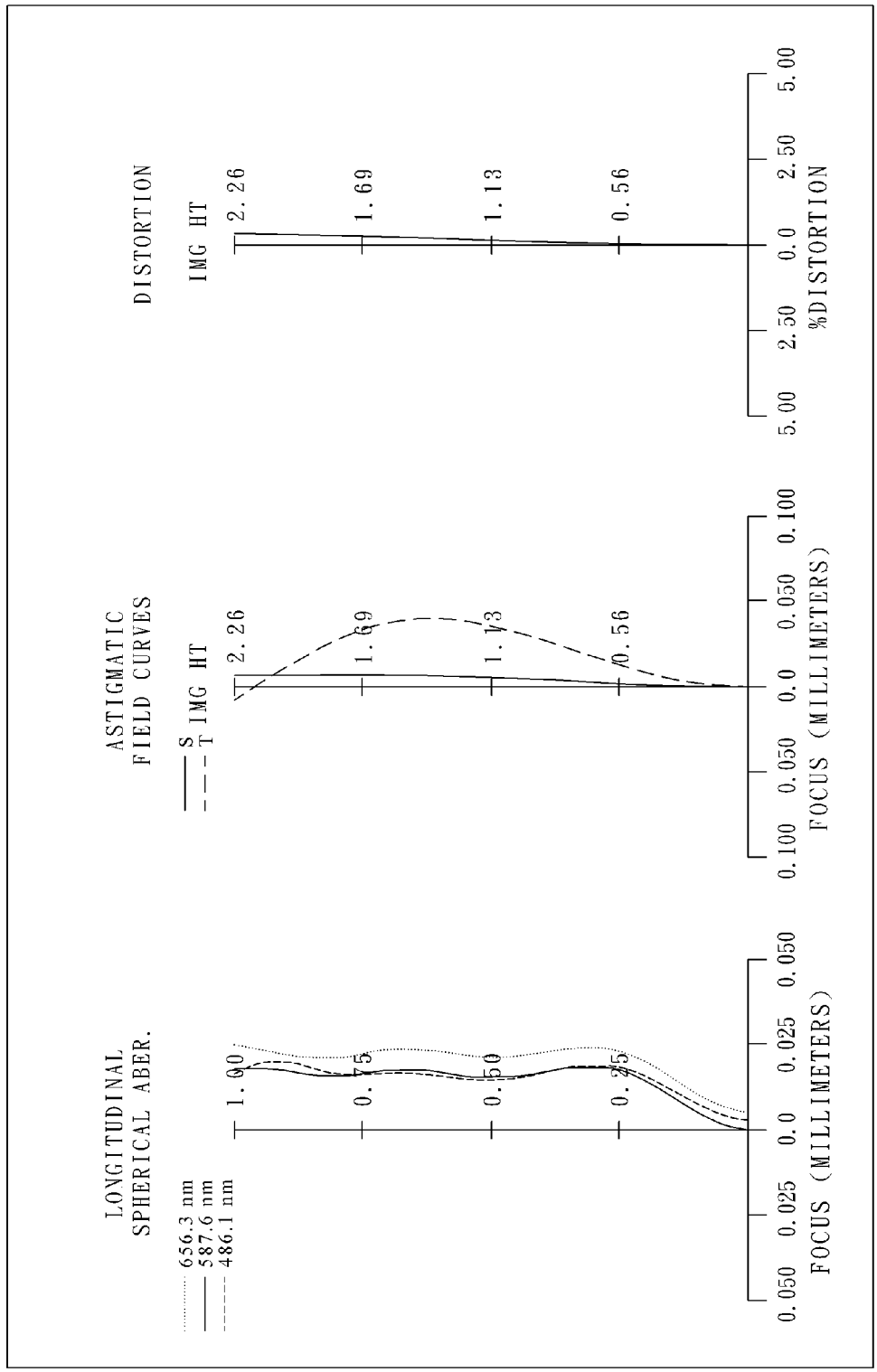
FIG. 4B shows spherical aberration curves, astigmatic field curves and a distortion curve of the image capturing device according to the 4th embodiment.

FIG. 4A is a schematic view of an image capturing device according to the 4th embodiment of the present disclosure. FIG. 4B shows, in order from left to right, spherical aberration curves, astigmatic field curves and a distortion curve of the image capturing device according to the 4th embodiment.

In FIG. 4A, the image capturing device includes the image capturing optical system (not otherwise herein labeled) of the present disclosure and an image sensor 490. The image capturing optical system includes, in order from an object side to an image side, a first lens element 410, an aperture stop 400, a second lens element 420, a third lens element 430, a fourth lens element 440, a fifth lens element 450, a prism 460, and an image surface 480, wherein the image capturing optical system has a total of five lens elements (410-450) with refractive power, which are non-cemented lens element.

The first lens element 410 with positive refractive power has an object-side surface 411 being convex in a paraxial region thereof and an image-side surface 412 being convex in a paraxial region thereof, which are both aspheric, the first lens element 410 is made of plastic material.

The second lens element 420 with negative refractive power has an object-side surface 421 being concave in a paraxial region thereof and an image-side surface 422 being concave in a paraxial region thereof, which are both aspheric, the second lens element 420 is made of plastic material, and the image-side surface 422 having at least one convex shape in an off-axis region thereof.

The third lens element 430 with positive refractive power has an object-side surface 431 being convex in a paraxial region thereof and an image-side surface 432 being convex in a paraxial region thereof, which are both aspheric, and the third lens element 430 is made of plastic material.

The fourth lens element 440 with positive refractive power has an object-side surface 441 being convex in a paraxial region thereof and an image-side surface 442 being concave in a paraxial region thereof, which are both aspheric, and the fourth lens element 440 is made of plastic material.

The fifth lens element 450 with negative refractive power has an object-side surface 451 being concave in a paraxial region thereof and an image-side surface 452 being concave in a paraxial region thereof, which are both aspheric, the fifth lens element 450 is made of plastic material, and the object-side surface 451 having at least one convex shape in an off-axis region thereof.

The prism 460 is made of glass and located between the fifth lens element 450 and the image surface 480, and will not affect the focal length of the image capturing optical system. The image sensor 490 is disposed on or near the image surface 480 of the image capturing optical system.

The detailed optical data of the fourth embodiment is shown in TABLE 7, and the aspheric surface data is shown in TABLE 8, wherein the units of the curvature radius, the thickness and the focal length are expressed in mm, and HFOV is half of the maximal field of view.

TABLE 7

(Embodiment 4)
f = 10.11 mm, Fno = 1.95, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.385 | ASP | 2.361 | Plastic | 1.544 | 55.9 | 6.63 |
| 2 | | −16.427 | ASP | 0.543 | | | | |
| 3 | Stop | Plano | | 0.561 | | | | |
| 4 | Lens 2 | −2.174 | ASP | 0.600 | Plastic | 1.639 | 23.5 | −2.26 |
| 5 | | 4.789 | ASP | 0.105 | | | | |
| 6 | Lens 3 | 3.265 | ASP | 0.738 | Plastic | 1.639 | 23.5 | 4.26 |
| 7 | | −14.998 | ASP | 0.050 | | | | |
| 8 | Lens 4 | 2.596 | ASP | 1.034 | Plastic | 1.544 | 55.9 | 5.22 |
| 9 | | 25.969 | ASP | 0.194 | | | | |
| 10 | Lens 5 | −8.170 | ASP | 0.615 | Plastic | 1.544 | 55.9 | −7.75 |
| 11 | | 8.955 | ASP | 0.500 | | | | |
| 12 | Prism | Plano | | 5.500 | Glass | 1.517 | 64.2 | — |
| 13 | | Plano | | 0.628 | | | | |
| 14 | Image Surface | Plano | | — | | | | |

Note:
Reference wavelength is d-line 587.6 nm

TABLE 8

Aspheric Coefficients

| Surface# | 1 | 2 | 4 | 5 | 6 |
|---|---|---|---|---|---|
| k = | −6.0042E−01 | 1.8670E+01 | −7.9811E+00 | −1.2564E+00 | −4.4191E+00 |
| A4 = | 5.9943E−04 | 6.4884E−03 | 1.7403E−02 | −4.3331E−02 | −8.7347E−02 |
| A6 = | −5.3523E−05 | −1.4506E−03 | −1.1231E−02 | 4.9297E−03 | 1.7841E−02 |
| A8 = | 1.3462E−05 | 1.1847E−04 | 4.6601E−03 | −3.3297E−04 | −1.3101E−03 |
| A10 = | −7.6268E−06 | −1.3374E−06 | −1.2573E−03 | | |
| A12 = | 1.0837E−06 | −1.4656E−06 | 2.0449E−04 | | |
| A14 = | −7.4673E−08 | 1.1476E−07 | −1.8262E−05 | | |
| A16 = | | | 6.7279E−07 | | |

| Surface# | 7 | 8 | 9 | 10 | 11 |
|---|---|---|---|---|---|
| k = | −1.2390E+01 | −1.0948E+01 | 2.0000E+01 | 5.8004E+00 | −9.0000E+01 |
| A4 = | −3.7665E−02 | 1.4321E−02 | −1.5038E−02 | −5.6296E−03 | 2.0031E−02 |
| A6 = | 1.9182E−02 | 4.2552E−03 | 1.1480E−02 | 1.6189E−02 | −4.7042E−03 |
| A8 = | −6.2046E−03 | −5.3919E−03 | −5.5390E−03 | −9.0573E−03 | 2.8878E−04 |
| A10 = | 1.6589E−03 | 2.1673E−03 | 3.1606E−03 | 4.2098E−03 | 1.2103E−04 |
| A12 = | −2.7381E−04 | −5.5995E−04 | −1.1206E−03 | −1.1645E−03 | −2.4192E−05 |
| A14 = | 2.4736E−05 | 7.8974E−05 | 1.8783E−04 | 1.6479E−04 | 1.3037E−06 |
| A16 = | −9.6266E−07 | −4.3616E−06 | −1.1723E−05 | −9.2173E−06 | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4$^{th}$ Embodiment | | | |
|---|---|---|---|
| f [mm] | 10.11 | R3/f2 | 0.96 |
| Fno | 1.95 | f2/f1 | −0.34 |
| HFOV [deg.] | 12.5 | f4/R6 | −0.35 |
| tan(HFOV) | 0.22 | Σ|f/fx| | 11.61 |
| Nmax | 1.639 | Rimg [mm] | ∞ |
| CT1/(CT2 + CT3) | 1.76 | SD11/SD52 | 1.46 |
| T12/(T23 + T34 + T45) | 3.16 | | |

5th Embodiment

Figure 5A:
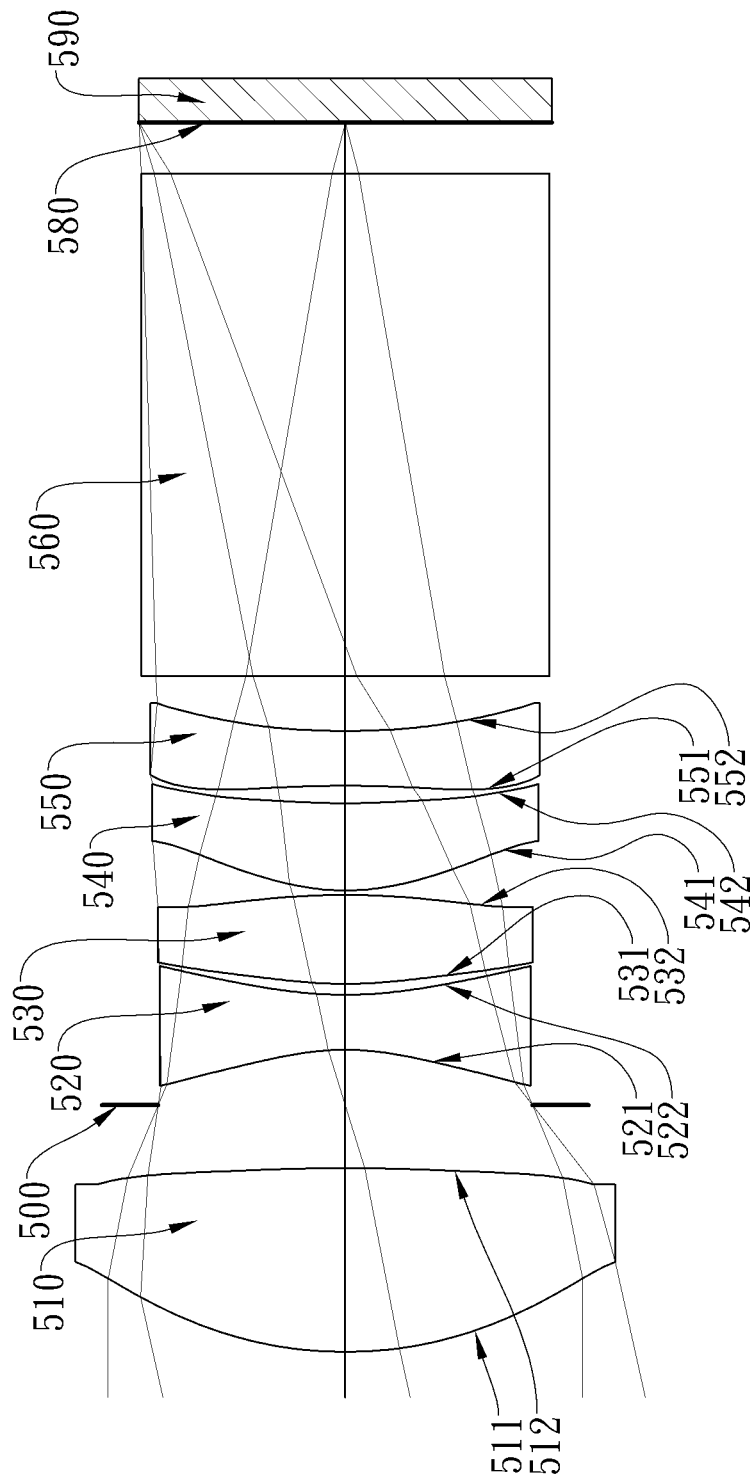
FIG. 5A is a schematic view of an image capturing device according to the 5th embodiment of the present disclosure.
Figure 5B:
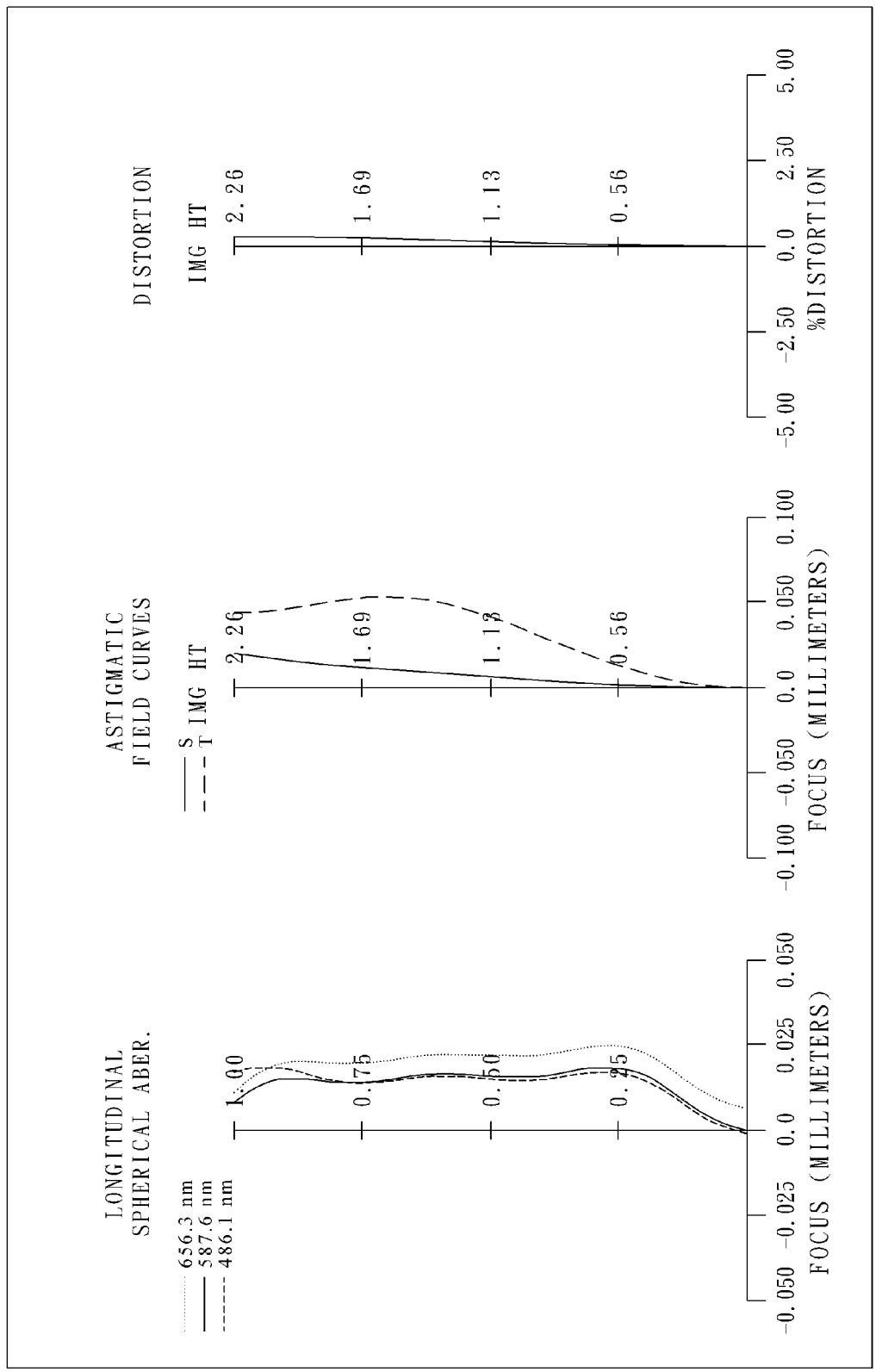
FIG. 5B shows spherical aberration curves, astigmatic field curves and a distortion curve of the image capturing device according to the 5th embodiment.

FIG. 5A is a schematic view of an image capturing device according to the 5th embodiment of the present disclosure. FIG. 5B shows, in order from left to right, spherical aberration curves, astigmatic field curves and a distortion curve of the image capturing device according to the 5th embodiment.

In FIG. 5A, the image capturing device includes the image capturing optical system (not otherwise herein labeled) of the present disclosure and an image sensor 590. The image capturing optical system includes, in order from an object side to an image side, a first lens element 510, an aperture stop 500, a second lens element 520, a third lens element 530, a fourth lens element 540, a fifth lens element 550, a prism 560 and an image surface 580, wherein the image capturing optical system has a total of five lens elements (510-550) with refractive power, which are non-cemented lens element.

The first lens element 510 with positive refractive power has an object-side surface 511 being convex in a paraxial region thereof and an image-side surface 512 being convex in a paraxial region thereof, which are both aspheric, the first lens element 510 is made of plastic material.

The second lens element 520 with negative refractive power has an object-side surface 521 being concave in a paraxial region thereof and an image-side surface 522 being concave in a paraxial region thereof, which are both aspheric, and the second lens element 520 is made of plastic material.

The third lens element 530 with positive refractive power has an object-side surface 531 being convex in a paraxial region thereof and an image-side surface 532 being convex in a paraxial region thereof, which are both aspheric, and the third lens element 530 is made of plastic material.

The fourth lens element 540 with positive refractive power has an object-side surface 541 being convex in a paraxial region thereof and an image-side surface 542 being concave in a paraxial region thereof, which are both aspheric, and the fourth lens element 540 is made of plastic material.

The fifth lens element 550 with negative refractive power has an object-side surface 551 being concave in a paraxial region thereof and an image-side surface 552 being concave in a paraxial region thereof, which are both aspheric, the fifth lens element 550 is made of plastic material and the object-side surface 551 has at least one convex shape in an off-axis region thereof.

The prism 560 is made of glass and located between the fifth lens element 550 and the image surface 580, and will not affect the focal length of the image capturing optical system. The image sensor 590 is disposed on or near the image surface 580 of the image capturing optical system.

The detailed optical data of the fifth embodiment is shown in TABLE 9, and the aspheric surface data is shown in TABLE 10, wherein the units of the curvature radius, the thickness and the focal length are expressed in mm, and HFOV is half of the maximal field of view.

TABLE 9

(Embodiment 5)
f = 10.11 mm, Fno = 1.95, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.403 | ASP | 2.010 | Plastic | 1.544 | 55.9 | 6.72 |
| 2 | | −18.125 | ASP | 0.688 | | | | |

TABLE 9-continued (Embodiment 5)
f = 10.11 mm, Fno = 1.95, HFOV = 12.5 deg.

| Surface # | | Curvature Radius | | Thickness | Material | Index | Abbe # | Focal Length |
|---|---|---|---|---|---|---|---|---|
| 3 | Stop | Plano | | 0.608 | | | | |
| 4 | Lens 2 | −2.683 | ASP | 0.600 | Plastic | 1.639 | 23.5 | −2.51 |
| 5 | | 4.317 | ASP | 0.119 | | | | |
| 6 | Lens 3 | 4.501 | ASP | 0.972 | Plastic | 1.639 | 23.5 | 4.93 |
| 7 | | −9.629 | ASP | 0.050 | | | | |
| 8 | Lens 4 | 2.458 | ASP | 0.954 | Plastic | 1.544 | 55.9 | 6.23 |
| 9 | | 7.725 | ASP | 0.191 | | | | |
| 10 | Lens 5 | −18.713 | ASP | 0.600 | Plastic | 1.544 | 55.9 | −10.52 |
| 11 | | 8.345 | ASP | 0.600 | | | | |
| 12 | Prism | Plano | | 5.500 | Glass | 1.517 | 64.2 | — |
| 13 | | Plano | | 0.558 | | | | |
| 14 | Image Surface | Plano | | — | | | | |

Note:
Reference wavelength is d-line 587.6 nm

TABLE 10

Aspheric Coefficients

| Surface# | 1 | 2 | 4 | 5 | 6 |
|---|---|---|---|---|---|
| k = | −4.0010E−01 | −2.2709E+01 | −1.0153E+01 | −1.4923E+01 | −2.3792E+01 |
| A4 = | 5.9032E−04 | 5.3970E−03 | 7.6756E−03 | | −1.3155E−02 |
| A6 = | −1.0997E−05 | −9.1966E−04 | −2.5417E−03 | | 4.2092E−03 |
| A8 = | 5.0880E−06 | 3.9966E−05 | 3.8181E−04 | | −3.7879E−04 |
| A10 = | −5.3589E−06 | −1.7378E−06 | −1.8343E−05 | | |
| A12 = | 7.0585E−07 | | | | |
| A14 = | −4.9449E−08 | | | | |

| Surface# | 7 | 8 | 9 | 10 | 11 |
|---|---|---|---|---|---|
| k = | −1.9754E+01 | −8.7679E+00 | −2.5646E+01 | 1.7181E+01 | −9.0000E+01 |
| A4 = | −1.8128E−02 | 1.7898E−02 | −3.3818E−02 | −1.9406E−02 | 2.3902E−02 |
| A6 = | 2.1147E−02 | −3.7957E−03 | 1.5644E−02 | 1.9164E−02 | −6.7561E−03 |
| A8 = | −1.2841E−02 | 4.6431E−05 | 2.3431E−03 | −4.3974E−03 | 8.8262E−04 |
| A10 = | 4.9611E−03 | | −3.3413E−03 | 2.0059E−04 | −2.9192E−05 |
| A12 = | −1.1341E−03 | | 9.7993E−04 | 7.1580E−05 | |
| A14 = | 1.4228E−04 | | −1.2917E−04 | −7.2791E−06 | |
| A16 = | −7.6095E−06 | | 6.8586E−06 | | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f [mm] | 10.11 | R3/f2 | 1.07 |
| Fno | 1.95 | f2/f1 | −0.37 |
| HFOV [deg.] | 12.5 | f4/R6 | −0.65 |
| tan(HFOV) | 0.22 | Σ|f/fx| | 10.17 |
| Nmax | 1.639 | Rimg [mm] | ∞ |
| CT1/(CT2 + CT3) | 1.28 | SD11/SD52 | 1.43 |
| T12/(T23 + T34 + T45) | 3.60 | | |

6th Embodiment

Figure 6A:
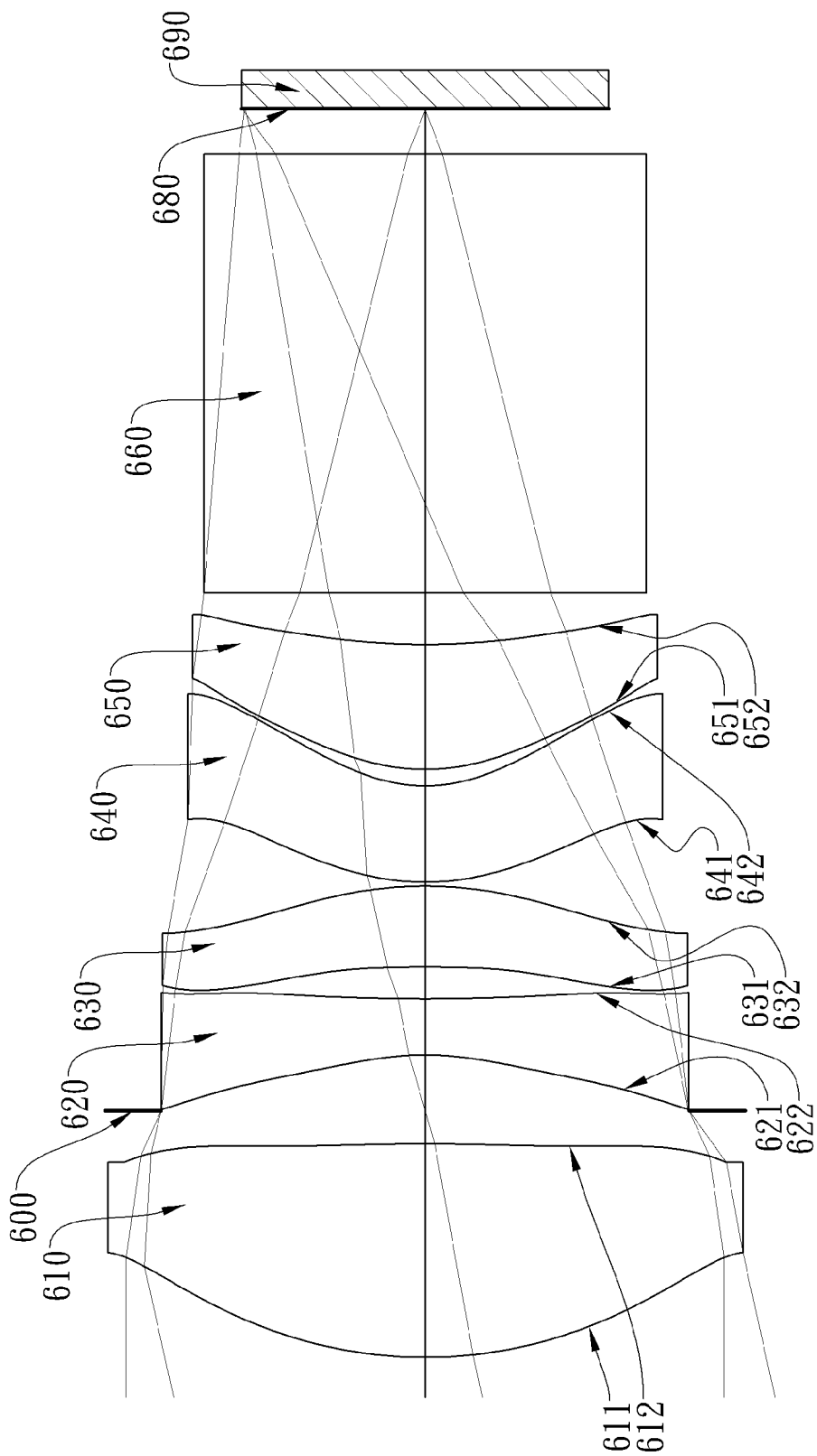
FIG. 6A is a schematic view of an image capturing device according to the 6th embodiment of the present disclosure.
Figure 6B:
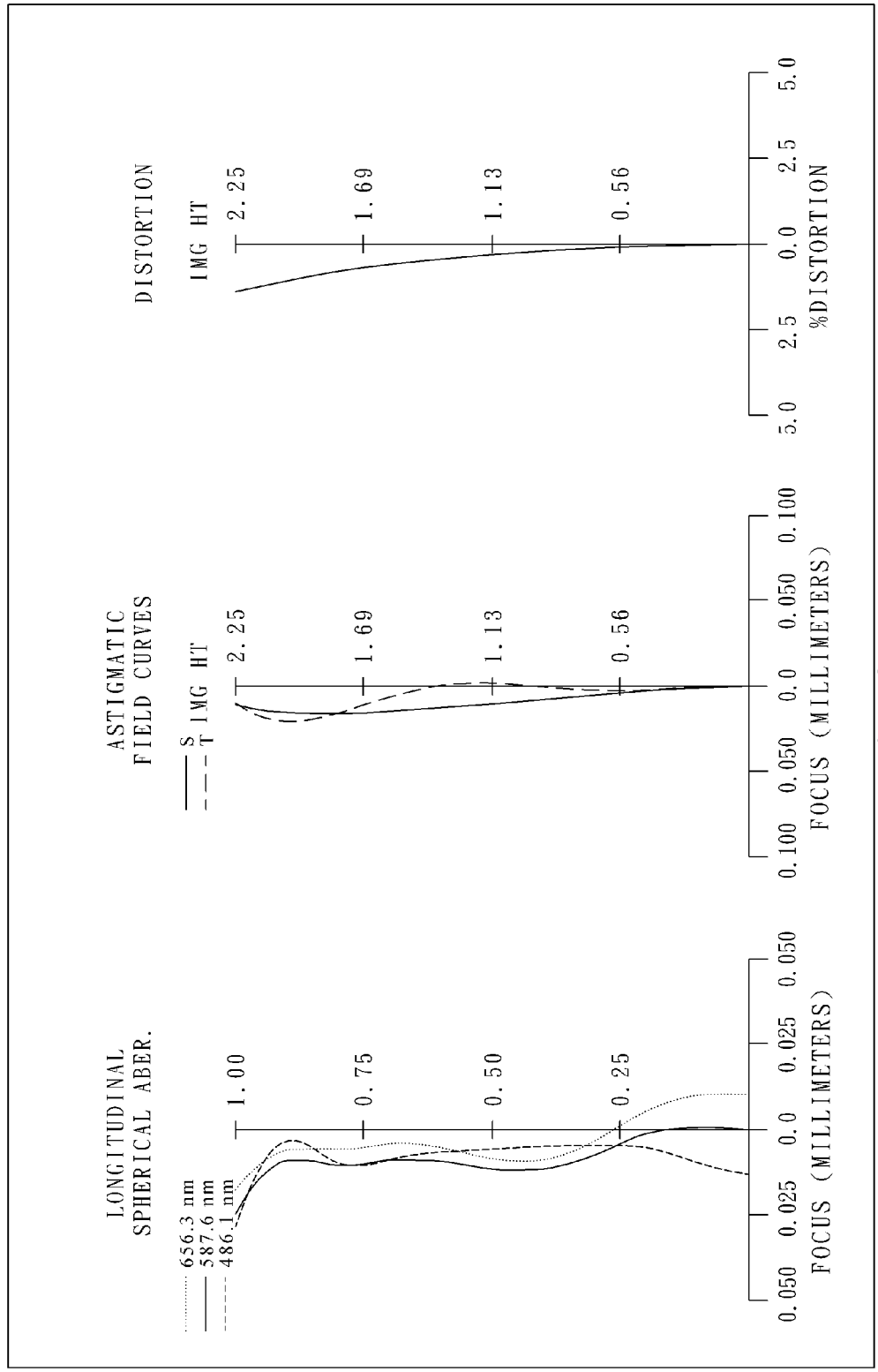
FIG. 6B shows spherical aberration curves, astigmatic field curves and a distortion curve of the image capturing device according to the 6th embodiment.

FIG. 6A is a schematic view of an image capturing device according to the 6th embodiment of the present disclosure. FIG. 6B shows, in order from left to right, spherical aberration curves, astigmatic field curves and a distortion curve of the image capturing device according to the 6th embodiment.

In FIG. 6A, the image capturing device includes the image capturing optical system (not otherwise herein labeled) of the present disclosure and an image sensor 690. The image capturing optical system includes, in order from an object side to an image side, a first lens element 610, an aperture stop 600, a second lens element 620, a third lens element 630, a fourth lens element 640, a fifth lens element 650, a prism 660 and an image surface 680, wherein the image capturing optical system has a total of five lens elements (610-650) with refractive power, which are non-cemented lens element.

The first lens element 610 with positive refractive power has an object-side surface 611 being convex in a paraxial region thereof and an image-side surface 612 being convex in a paraxial region thereof, which are both aspheric, the first lens element 610 is made of plastic material.

The second lens element 620 with negative refractive power has an object-side surface 621 being concave in a paraxial region thereof and an image-side surface 622 being concave in a paraxial region thereof, which are both aspheric, the second lens element 620 is made of plastic material, and the image-side surface 622 has at least one convex shape in an off-axis region thereof.

The third lens element 630 with positive refractive power has an object-side surface 631 being concave in a paraxial region thereof and an image-side surface 632 being convex in a paraxial region thereof, which are both aspheric, and the third lens element 630 is made of plastic material.

The fourth lens element 640 with negative refractive power has an object-side surface 641 being convex in a paraxial region thereof and an image-side surface 642 being concave in a paraxial region thereof, which are both aspheric, and the fourth lens element 640 is made of plastic material.

The fifth lens element 650 with positive refractive power has an object-side surface 651 being convex in a paraxial region thereof and an image-side surface 652 being concave in a paraxial region thereof, which are both aspheric, the fifth lens element 650 is made of plastic material, and both of the object-side surface 651 and the image-side surface 625 have at least one convex shape in an off-axis region thereof.

The prism 660 is made of glass and located between the fifth lens element 650 and the image surface 680, and will not affect the focal length of the image capturing optical system. The image sensor 690 is disposed on or near the image surface 680 of the image capturing optical system.

The detailed optical data of the sixth embodiment is shown in TABLE 11, and the aspheric surface data is shown in TABLE 12, wherein the units of the curvature radius, the thickness and the focal length are expressed in mm, and HFOV is half of the maximal field of view.

TABLE 11

(Embodiment 6)
f = 10.33 mm, Fno = 1.38, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.597 | ASP | 2.677 | Plastic | 1.544 | 55.9 | 8.64 |
| 2 | | −24.409 | ASP | 0.414 | | | | |
| 3 | Stop | Plano | | 0.703 | | | | |
| 4 | Lens 2 | −3.469 | ASP | 0.700 | Plastic | 1.639 | 23.5 | −4.61 |
| 5 | | 21.163 | ASP | 0.400 | | | | |
| 6 | Lens 3 | −32.819 | ASP | 1.016 | Plastic | 1.639 | 23.5 | 9.01 |
| 7 | | −4.956 | ASP | 0.050 | | | | |
| 8 | Lens 4 | 3.102 | ASP | 1.207 | Plastic | 1.639 | 23.5 | −13.98 |
| 9 | | 1.953 | ASP | 0.208 | | | | |
| 10 | Lens 5 | 2.668 | ASP | 1.564 | Plastic | 1.544 | 55.9 | 6.63 |
| 11 | | 8.145 | ASP | 0.650 | | | | |
| 12 | Prism | Plano | | 5.500 | Glass | 1.517 | 64.2 | — |
| 13 | | Plano | | 0.570 | | | | |
| 14 | Image Surface | Plano | | — | | | | |

Note:
Reference wavelength is d-line 587.6 nm

TABLE 12

| Aspheric Coefficients | | | | | |
|---|---|---|---|---|---|
| Surface# | 1 | 2 | 4 | 5 | 6 |
| k = | −1.6983E−01 | 1.8242E+01 | −8.1099E+00 | 1.9319E+01 | 1.7897E+01 |
| A4 = | 3.4920E−05 | 4.7287E−03 | 1.0749E−02 | −5.8800E−03 | −2.7463E−02 |
| A6 = | 3.2729E−05 | −1.6952E−04 | −1.4177E−03 | 2.9835E−03 | 8.3192E−03 |
| A8 = | −9.0979E−06 | −3.7961E−05 | −3.9336E−05 | −7.9681E−04 | −1.2348E−03 |
| A10 = | 6.2626E−07 | 3.0663E−06 | 1.9132E−05 | 9.2219E−05 | 1.0470E−04 |
| A12 = | −3.0411E−08 | −7.2076E−08 | −1.3255E−06 | −4.7220E−06 | −4.6266E−06 |
| A14 = | | | 3.0122E−08 | 8.7015E−08 | 8.3084E−08 |
| Surface# | 7 | 8 | 9 | 10 | 11 |
| k = | −8.5776E+00 | −2.2888E+00 | −3.2392E+00 | −7.7028E+00 | −9.0000E+01 |
| A4 = | −9.5772E−03 | 1.9796E−03 | 2.9846E−02 | 4.5261E−02 | 1.7303E−02 |
| A6 = | 3.0089E−03 | −1.8896E−03 | −1.9276E−02 | −2.3257E−02 | −8.5626E−03 |
| A8 = | −4.9321E−04 | 5.4036E−04 | 6.7816E−03 | 6.9084E−03 | 2.5589E−03 |
| A10 = | 6.8686E−05 | −9.6698E−05 | −1.4732E−03 | −1.2935E−03 | −5.0238E−04 |
| A12 = | −6.8182E−06 | 7.6031E−06 | 1.8905E−04 | 1.5095E−04 | 6.3036E−05 |
| A14 = | 3.6689E−07 | −2.1938E−07 | −1.3081E−05 | −9.7778E−06 | −4.3358E−06 |
| A16 = | −7.6112E−09 | | 3.7339E−07 | 2.6072E−07 | 1.1807E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 10.33 | R3/f2 | 0.75 |
| Fno | 1.38 | f2/f1 | −0.53 |
| HFOV [deg.] | 12.5 | f4/R6 | 2.82 |
| tan(HFOV) | 0.22 | Σ|f/fx| | 6.88 |
| Nmax | 1.639 | Rimg [mm] | ∞ |
| CT1/(CT2 + CT3) | 1.56 | SD11/SD52 | 1.42 |
| T12/(T23 + T34 + T45) | 1.70 | | |

7th Embodiment

Figure 7A:
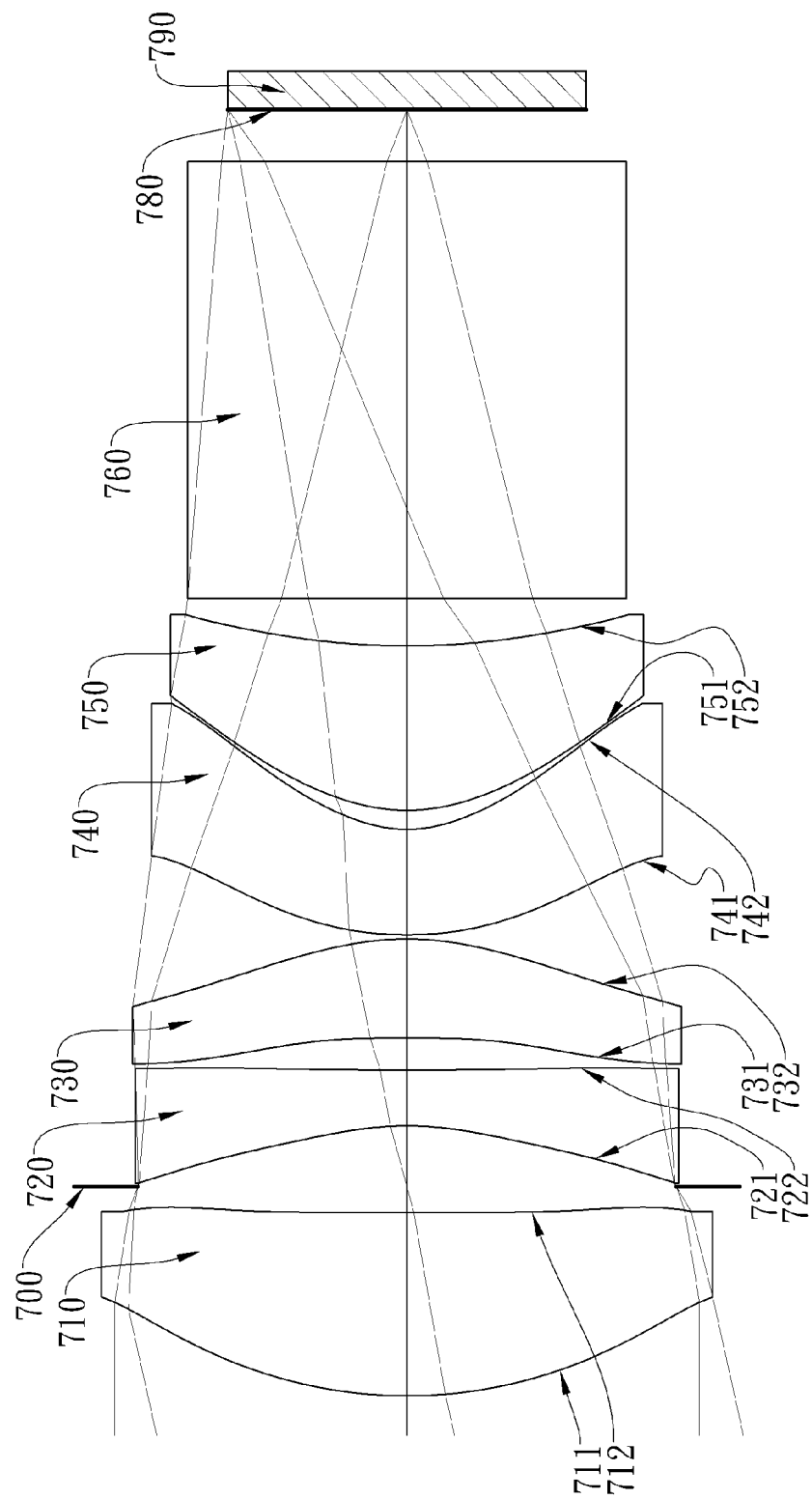
FIG. 7A is a schematic view of an image capturing device according to the 7th embodiment of the present disclosure.
Figure 7B:
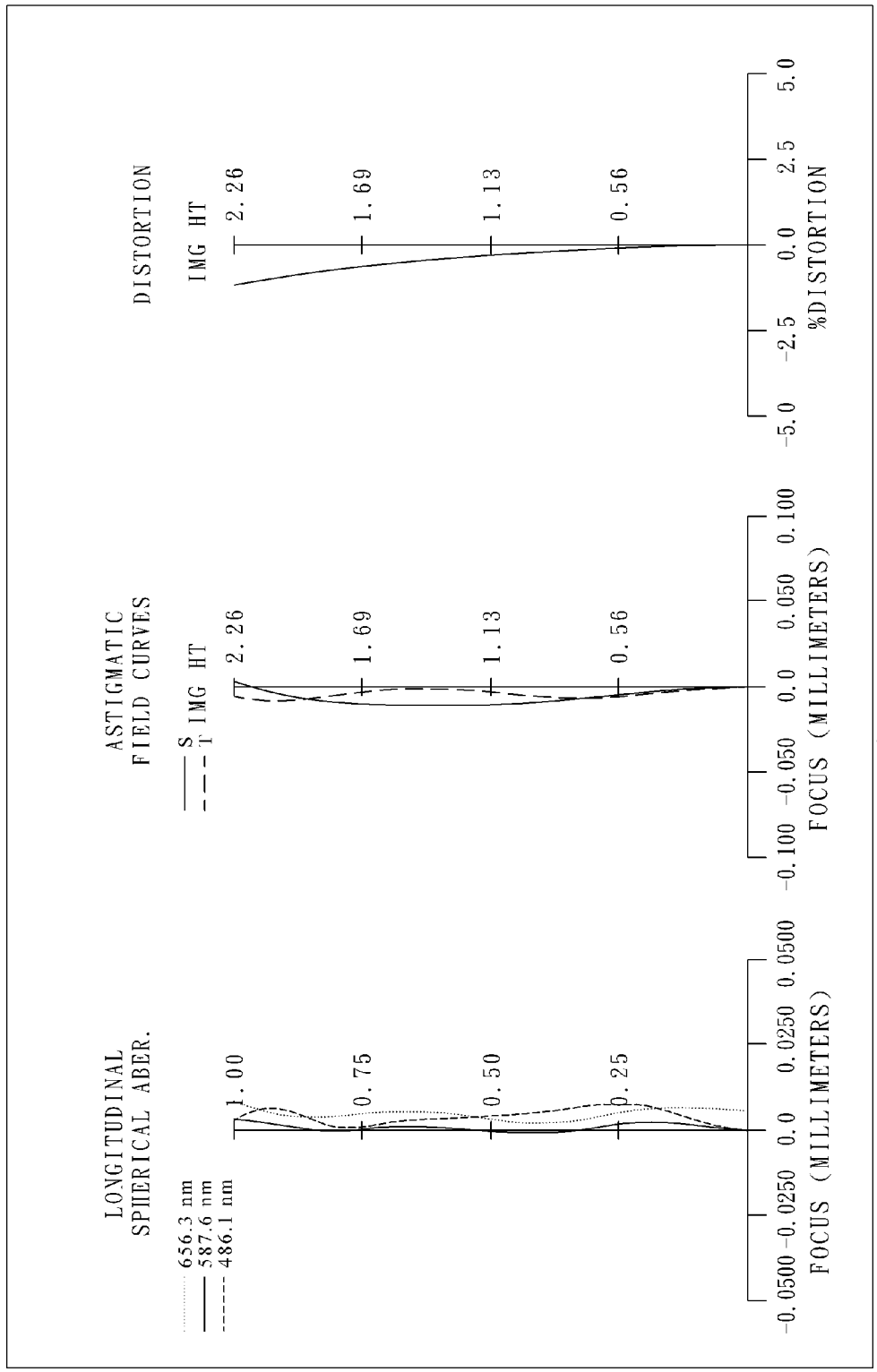
FIG. 7B shows spherical aberration curves, astigmatic field curves and a distortion curve of the image capturing device according to the 7th embodiment.

FIG. 7A is a schematic view of an image capturing device according to the 7th embodiment of the present disclosure. FIG. 7B shows, in order from left to right, spherical aberration curves, astigmatic field curves and a distortion curve of the image capturing device according to the 7th embodiment.

In FIG. 7A, the image capturing device includes the image capturing optical system (not otherwise herein labeled) of the present disclosure and an image sensor 790. The image capturing optical system includes, in order from an object side to an image side, a first lens element 710, an aperture stop 700, a second lens element 720, a third lens element 730, a fourth lens element 740, a fifth lens element 750, a prism 760 and an image surface 780, wherein the image capturing optical system has a total of five lens elements (710-750) with refractive power, which are non-cemented lens element.

The first lens element 710 with positive refractive power has an object-side surface 711 being convex in a paraxial region thereof and an image-side surface 712 being convex in a paraxial region thereof, which are both aspheric, the first lens element 710 is made of plastic material.

The second lens element 720 with negative refractive power has an object-side surface 721 being concave in a paraxial region thereof and an image-side surface 722 being concave in a paraxial region thereof, which are both aspheric, the second lens element 720 is made of plastic material, and the image-side surface 722 has at least one convex shape in an off-axis region thereof.

The third lens element 730 with positive refractive power has an object-side surface 731 being concave in a paraxial region thereof and an image-side surface 732 being convex in a paraxial region thereof, which are both aspheric, and the third lens element 730 is made of plastic material.

The fourth lens element 740 with negative refractive power has an object-side surface 741 being convex in a paraxial region thereof and an image-side surface 742 being concave in a paraxial region thereof, which are both aspheric, and the fourth lens element 740 is made of plastic material.

The fifth lens element 750 with positive refractive power has an object-side surface 751 being convex in a paraxial region thereof and an image-side surface 752 being concave in a paraxial region thereof, which are both aspheric, the fifth lens element 750 is made of plastic material, and the object-side surface 751 has at least one convex shape in an off-axis region thereof.

The prism 760 is made of glass and located between the fifth lens element 750 and the image surface 780, and will not affect the focal length of the image capturing optical system. The image sensor 790 is disposed on or near the image surface 780 of the image capturing optical system.

The detailed optical data of the seventh embodiment is shown in TABLE 13, and the aspheric surface data is shown in TABLE 14, wherein the units of the curvature radius, the thickness and the focal length are expressed in mm, and HFOV is half of the maximal field of view.

TABLE 13

(Embodiment 7)
f = 10.29 mm, Fno = 1.40, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 5.848 | ASP | 2.308 | Plastic | 1.544 | 55.9 | 10.27 |
| 2 | | −108.886 | ASP | 0.323 | | | | |
| 3 | Stop | Plano | | 0.766 | | | | |
| 4 | Lens 2 | −3.968 | ASP | 0.700 | Plastic | 1.639 | 23.5 | −5.58 |
| 5 | | 37.421 | ASP | 0.407 | | | | |
| 6 | Lens 3 | −39.068 | ASP | 1.248 | Plastic | 1.639 | 23.5 | 5.94 |
| 7 | | −3.501 | ASP | 0.050 | | | | |
| 8 | Lens 4 | 4.258 | ASP | 1.328 | Plastic | 1.639 | 23.5 | −4.97 |
| 9 | | 1.597 | ASP | 0.239 | | | | |
| 10 | Lens 5 | 2.211 | ASP | 2.069 | Plastic | 1.544 | 55.9 | 4.86 |
| 11 | | 9.024 | ASP | 0.600 | | | | |
| 12 | Prism | Plano | | 5.500 | Glass | 1.517 | 64.2 | — |
| 13 | | Plano | | 0.651 | | | | |
| 14 | Image Surface | Plano | | — | | | | |

Note:
Reference wavelength is d-line 587.6 nm

TABLE 14

Aspheric Coefficients

| Surface# | 1 | 2 | 4 | 5 | 6 |
|---|---|---|---|---|---|
| k = | −1.0328E−01 | 2.0000E+01 | −6.4516E+00 | 1.8282E+01 | 1.6962E+01 |
| A4 = | 3.3169E−05 | 2.7671E−03 | 7.1187E−03 | −6.9851E−03 | −2.2437E−02 |
| A6 = | 4.0545E−05 | 3.1316E−05 | −5.0689E−04 | 2.9269E−03 | 6.2069E−03 |
| A8 = | −1.0660E−05 | −3.7921E−05 | −1.0253E−04 | −6.2642E−04 | −8.8897E−04 |
| A10 = | 7.7811E−07 | 2.2008E−06 | 1.7910E−05 | 6.7565E−05 | 7.7464E−05 |
| A12 = | −3.3921E−08 | −4.2425E−08 | −1.0214E−06 | −3.5915E−06 | −3.7908E−06 |
| A14 = | | | 2.0897E−08 | 7.5500E−08 | 7.8457E−08 |

| Surface# | 7 | 8 | 9 | 10 | 11 |
|---|---|---|---|---|---|
| k = | −8.8989E+00 | −7.9360E−01 | −3.1213E+00 | −3.8534E+00 | −9.0000E+01 |
| A4 = | −4.1634E−03 | 4.5553E−03 | 3.0423E−03 | 6.0916E−03 | 1.3752E−02 |
| A6 = | 1.0557E−03 | −8.1211E−04 | 4.5634E−03 | 9.7002E−04 | −5.6205E−03 |
| A8 = | −1.4940E−04 | −3.0907E−05 | −1.6516E−03 | −1.1900E−04 | 1.7705E−03 |
| A10 = | 1.8390E−05 | 1.1467E−05 | 2.3059E−04 | −1.0488E−04 | −3.9486E−04 |
| A12 = | −1.5597E−06 | −1.0112E−06 | −1.2566E−05 | 2.9858E−05 | 5.5781E−05 |
| A14 = | 6.8817E−08 | 3.0767E−08 | −1.7831E−07 | −3.0469E−06 | −4.3451E−06 |
| A16 = | −1.1667E−09 | | 3.1277E−08 | 1.1106E−07 | 1.4108E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 10.29 | R3/f2 | 0.71 |
| Fno | 1.40 | f2/f1 | −0.54 |
| HFOV [deg.] | 12.5 | f4/R6 | 1.42 |
| tan(HFOV) | 0.22 | Σ|f/fx| | 8.77 |
| Nmax | 1.639 | Rimg [mm] | ∞ |
| CT1/(CT2 + CT3) | 1.18 | SD11/SD52 | 1.38 |
| T12/(T23 + T34 + T45) | 1.56 | | |

8th Embodiment

Figure 8A:
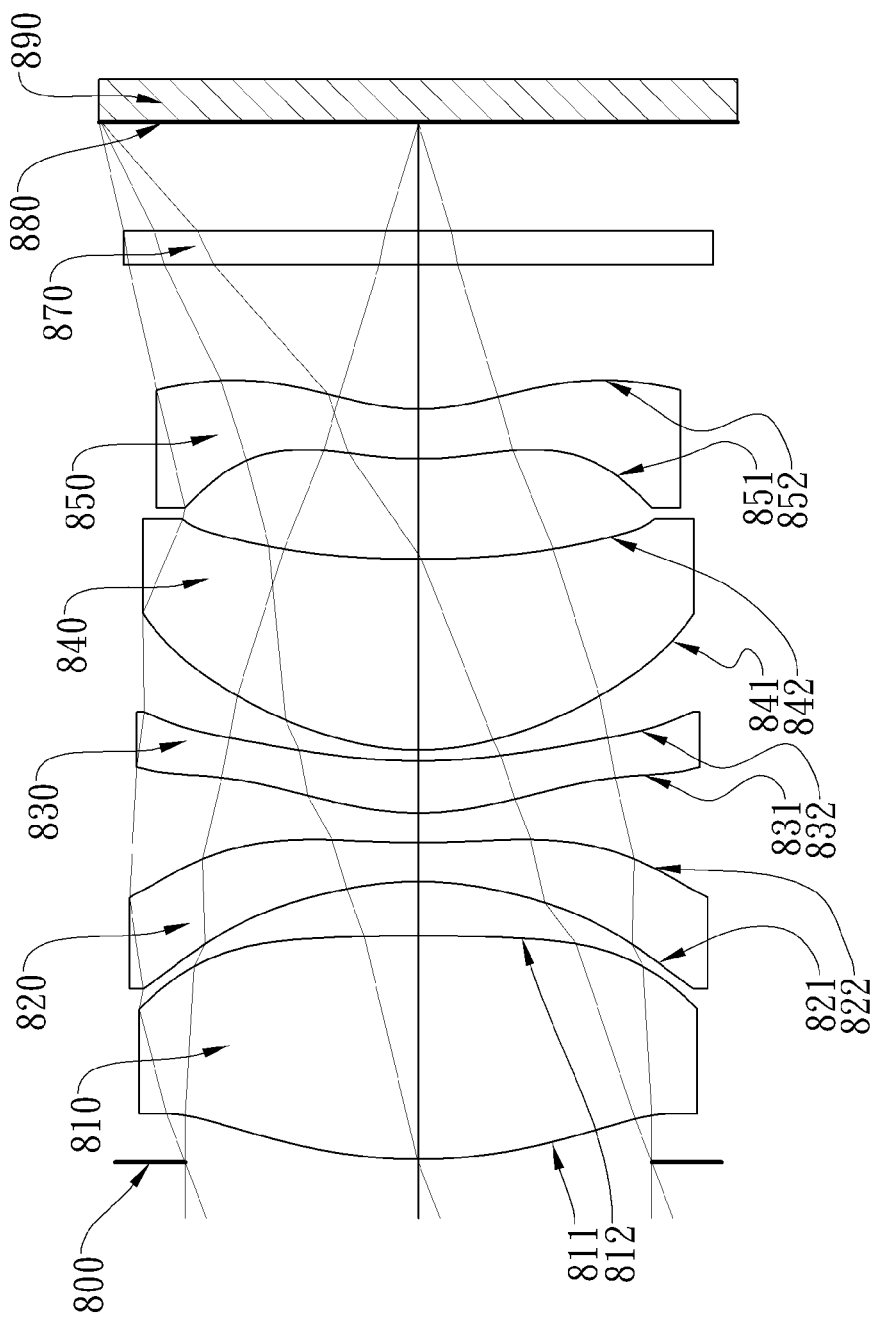
FIG. 8A is a schematic view of an image capturing device according to the 8th embodiment of the present disclosure.
Figure 8B:
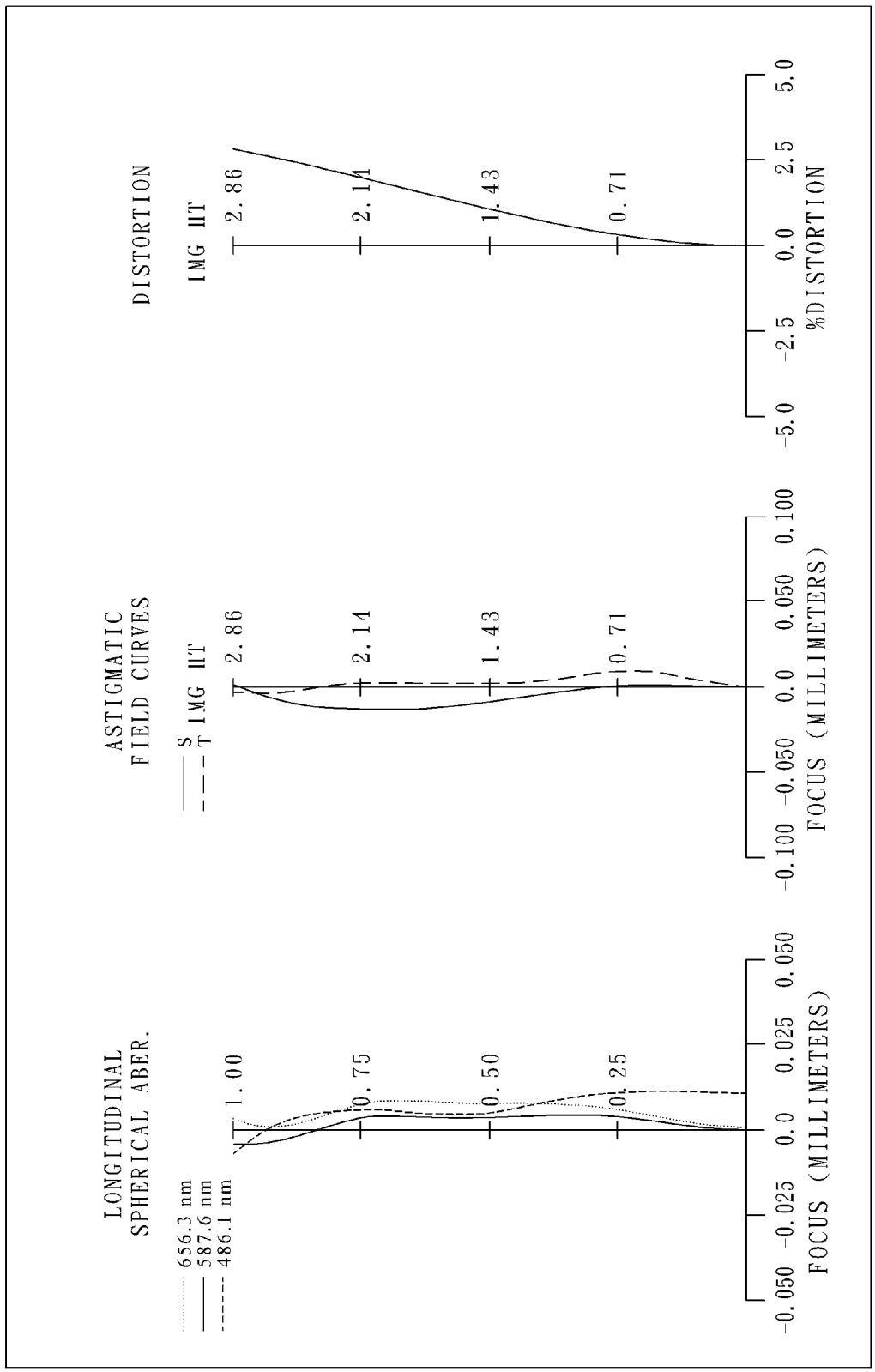
FIG. 8B shows spherical aberration curves, astigmatic field curves and a distortion curve of the image capturing device according to the 8th embodiment.

FIG. 8A is a schematic view of an image capturing device according to the 8th embodiment of the present disclosure. FIG. 8B shows, in order from left to right, spherical aberration curves, astigmatic field curves and a distortion curve of the image capturing device according to the 8th embodiment.

In FIG. 8A, the image capturing device includes the image capturing optical system (not otherwise herein labeled) of the present disclosure and an image sensor 890. The image capturing optical system includes, in order from an object side to an image side, an aperture stop 800, a first lens element 810, a second lens element 820, a third lens element 830, a fourth lens element 840, a fifth lens element 850, an IR-cut filter 870, and an image surface 880, wherein the image capturing optical system has a total of five lens elements (810-850) with refractive power, which are non-cemented lens element.

The first lens element 810 with positive refractive power has an object-side surface 811 being convex in a paraxial region thereof and an image-side surface 812 being convex in a paraxial region thereof, which are both aspheric, the first lens element 810 is made of glass.

The second lens element 820 with negative refractive power has an object-side surface 821 being concave in a paraxial region thereof and an image-side surface 822 being concave in a paraxial region thereof, which are both aspheric, the second lens element 820 is made of plastic material, and the image-side surface 822 has at least one convex shape in an off-axis region thereof.

The third lens element 830 with positive refractive power has an object-side surface 831 being convex in a paraxial region thereof and an image-side surface 832 being concave in a paraxial region thereof, which are both aspheric, and the third lens element 830 is made of plastic material.

The fourth lens element 840 with positive refractive power has an object-side surface 841 being convex in a paraxial region thereof and an image-side surface 842 being concave in a paraxial region thereof, which are both aspheric, and the fourth lens element 840 is made of plastic material.

The fifth lens element 850 with negative refractive power has an object-side surface 851 being convex in a paraxial region thereof and an image-side surface 852 being concave in a paraxial region thereof, which are both aspheric, the fifth lens element 850 is made of plastic material, and both of the object-side surface 851 and the image-side surface 852 have at least one convex shape in an off-axis region thereof.

The IR-cut filter 870 is made of glass and located between the fifth lens element 850 and the image surface 880, and will not affect the focal length of the image capturing optical system. The image sensor 890 is disposed on or near the image surface 880 of the image capturing optical system.

The detailed optical data of the eighth embodiment is shown in TABLE 15, and the aspheric surface data is shown in TABLE 16, wherein the units of the curvature radius, the thickness and the focal length are expressed in mm, and HFOV is half of the maximal field of view.

TABLE 15

(Embodiment 8)
f = 7.22 mm, Fno = 1.72, HFOV = 21.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 0.029 | | | | |
| 2 | Lens 1 | 4.493 | ASP | 2.013 | Glass | 1.542 | 62.9 | 6.98 |
| 3 | | −20.230 | ASP | 0.488 | | | | |
| 4 | Lens 2 | −2.882 | ASP | 0.350 | Plastic | 1.633 | 23.4 | −3.21 |
| 5 | | 7.207 | ASP | 0.266 | | | | |
| 6 | Lens 3 | 2.474 | ASP | 0.470 | Plastic | 1.633 | 23.4 | 7.05 |
| 7 | | 5.143 | ASP | 0.100 | | | | |
| 8 | Lens 4 | 2.355 | ASP | 1.717 | Plastic | 1.544 | 55.9 | 5.45 |
| 9 | | 8.498 | ASP | 0.902 | | | | |
| 10 | Lens 5 | 2.841 | ASP | 0.450 | Plastic | 1.530 | 55.8 | −12.53 |
| 11 | | 1.881 | ASP | 1.300 | | | | |
| 12 | IR-cut filter | Plano | | 0.300 | Glass | 1.517 | 64.2 | — |
| 13 | | Plano | | 0.980 | | | | |
| 14 | Image Surface | Plano | | — | | | | |

Note:
Reference wavelength is d-line 587.6 nm

TABLE 16

| Aspheric Coefficients | | | | | |
|---|---|---|---|---|---|
| Surface# | 2 | 3 | 4 | 5 | 6 |
| k = | −1.5623E+00 | −5.0000E+01 | −9.9074E+00 | −5.0000E+01 | −6.2393E−01 |
| A4 = | −7.7674E−04 | 2.3984E−03 | −1.1075E−03 | −3.4368E−02 | −5.2452E−02 |
| A6 = | −5.3943E−04 | −5.4201E−03 | −8.2465E−03 | 5.1342E−03 | 8.8352E−03 |
| A8 = | 8.7492E−05 | 4.7260E−04 | 2.6725E−03 | −6.0650E−04 | −1.2967E−03 |
| A10 = | −7.3206E−05 | 3.1413E−05 | −5.4290E−04 | 9.6271E−06 | 3.2135E−05 |
| A12 = | 1.6833E−05 | −5.7110E−06 | 6.9822E−05 | 5.1140E−06 | 1.0360E−05 |
| A14 = | −1.6919E−06 | 8.1852E−08 | −4.3520E−06 | 3.7827E−08 | 1.3164E−06 |
| A16 = | | | 9.0134E−08 | −3.2457E−08 | −2.3721E−07 |

| Surface# | 7 | 8 | 9 | 10 | 11 |
|---|---|---|---|---|---|
| k = | 0.0000E+00 | −6.9610E+00 | −1.9061E+01 | −1.1974E+01 | −4.7950E+00 |
| A4 = | −1.5838E−02 | 1.6857E−02 | −3.0451E−04 | −5.5201E−02 | −4.6313E−02 |
| A6 = | 5.9195E−03 | 3.1510E−03 | 9.1536E−03 | −5.3646E−03 | 4.7433E−03 |
| A8 = | −2.6842E−03 | −3.2384E−03 | −4.8569E−03 | 7.8388E−03 | 2.6306E−03 |
| A10 = | 6.9903E−04 | 1.0449E−03 | 1.2483E−03 | −2.8190E−03 | −1.5281E−03 |
| A12 = | −9.7991E−05 | −1.8259E−04 | −1.8688E−04 | 3.1394E−04 | 3.5580E−04 |

TABLE 16-continued

| Aspheric Coefficients | | | | | |
|---|---|---|---|---|---|
| A14 = | 8.8325E−06 | 1.8511E−05 | 1.2072E−05 | 2.8123E−05 | −3.9329E−05 |
| A16 = | −4.4819E−07 | −8.1896E−07 | 6.2260E−07 | −5.7300E−06 | 1.6731E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8$^{th}$ Embodiment | | | |
|---|---|---|---|
| f [mm] | 7.22 | R3/f2 | 0.90 |
| Fno | 1.72 | f2/f1 | −0.46 |
| HFOV [deg.] | 21.0 | f4/R6 | 1.06 |
| tan(HFOV) | 0.38 | Σ|f/fx| | 6.21 |
| Nmax | 1.633 | Rimg [mm] | ∞ |
| CT1/(CT2 + CT3) | 2.45 | SD11/SD52 | 0.89 |
| T12/(T23 + T34 + T45) | 0.38 | | |

9th Embodiment

Figure 9A:
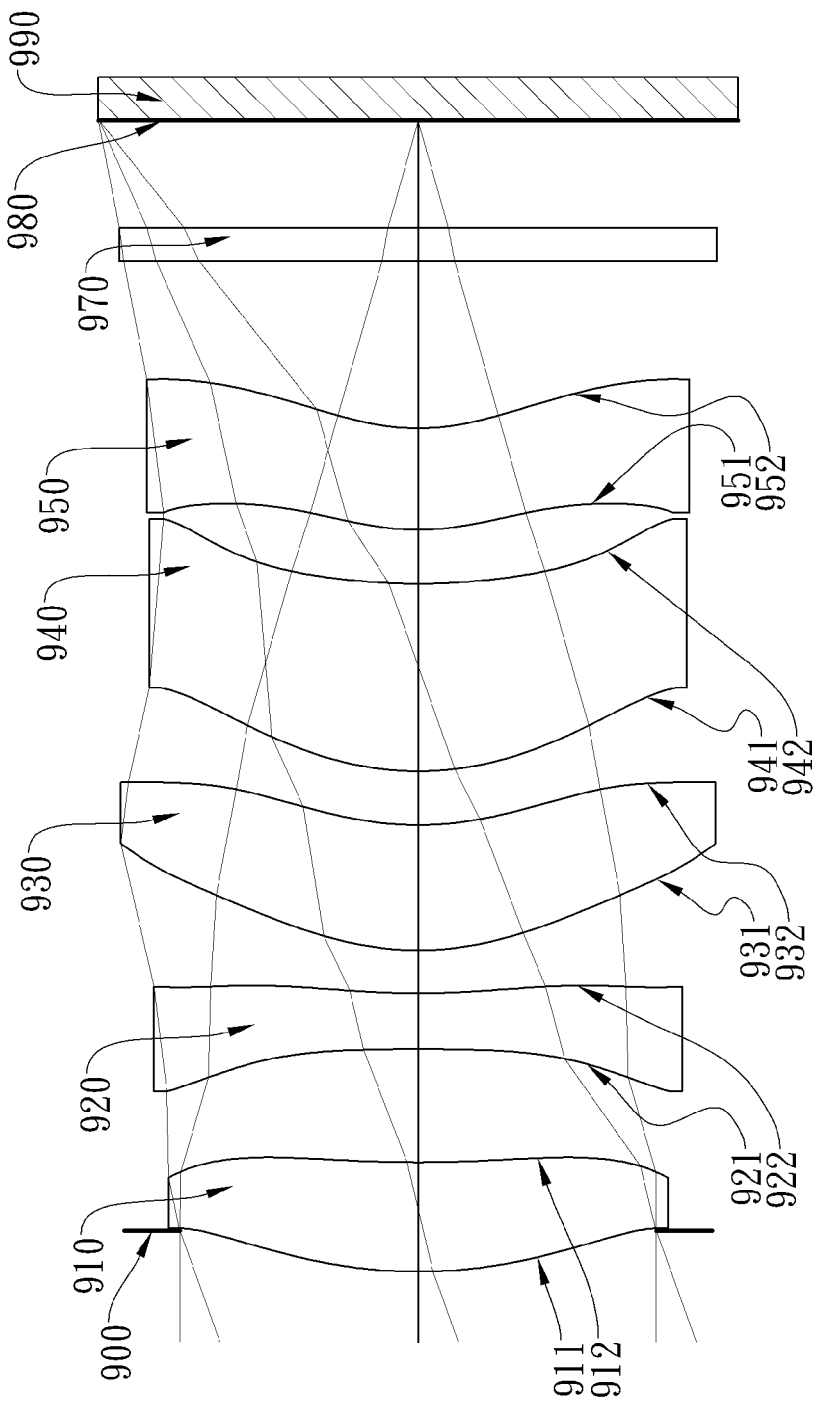
FIG. 9A is a schematic view of an image capturing device according to the 9th embodiment of the present disclosure.
Figure 9B:
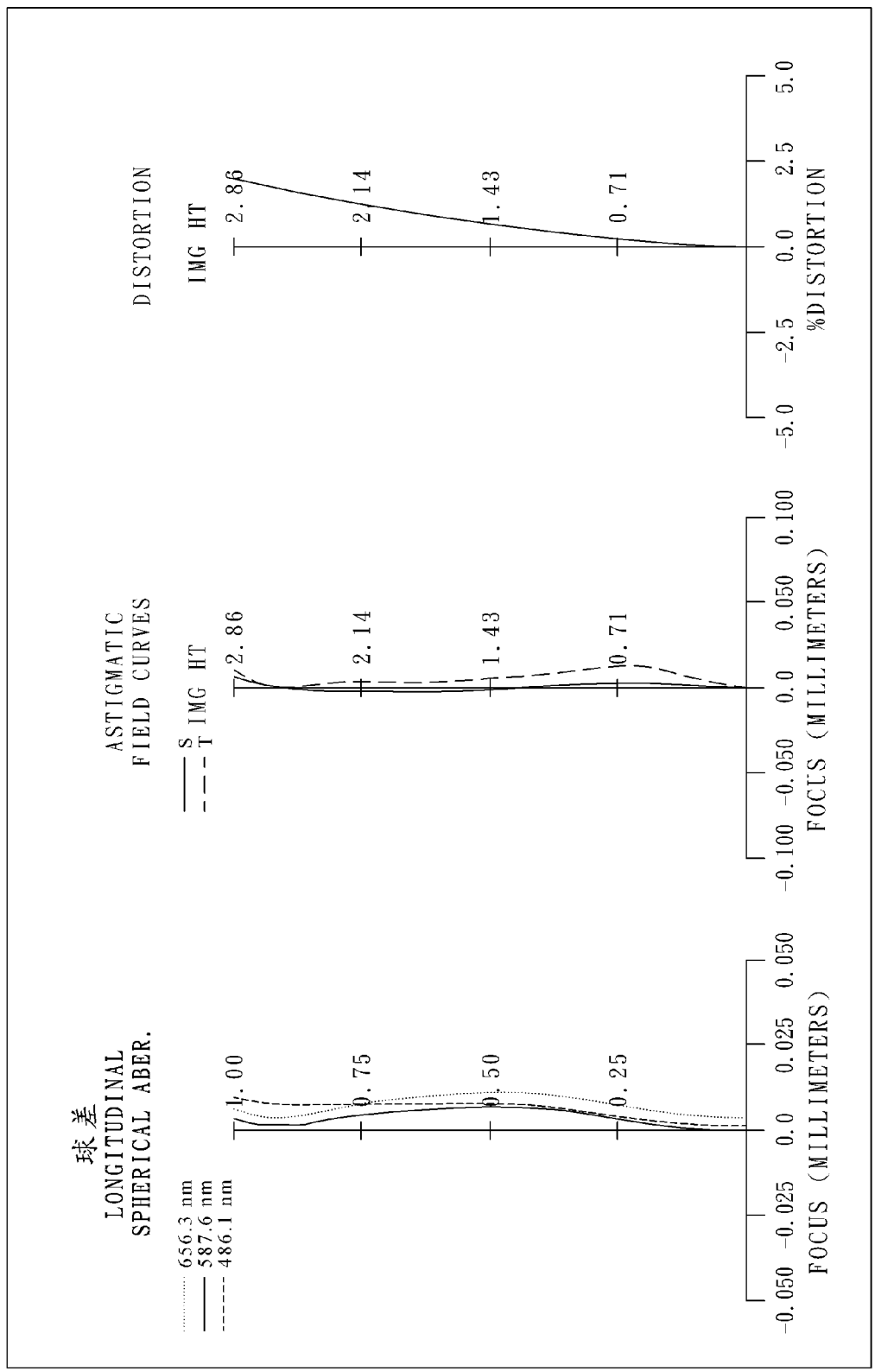
FIG. 9B shows spherical aberration curves, astigmatic field curves and a distortion curve of the image capturing device according to the 9th embodiment.

FIG. 9A is a schematic view of an image capturing device according to the 9th embodiment of the present disclosure. FIG. 9B shows, in order from left to right, spherical aberration curves, astigmatic field curves and a distortion curve of the image capturing device according to the 9th embodiment.

In FIG. 9A, the image capturing device includes the image capturing optical system (not otherwise herein labeled) of the present disclosure and an image sensor 990. The image capturing optical system includes, in order from an object side to an image side, an aperture stop 900, a first lens element 910, a second lens element 920, a third lens element 930, a fourth lens element 940, a fifth lens element 950, an IR-cut filter 970 and an image surface 980, wherein the image capturing optical system has a total of five lens elements (910-950) with refractive power, which are non-cemented lens element.

The first lens element 910 with positive refractive power has an object-side surface 911 being convex in a paraxial region thereof and an image-side surface 912 being concave in a paraxial region thereof, which are both aspheric, the first lens element 910 is made of plastic material.

The second lens element 920 with negative refractive power has an object-side surface 921 being concave in a paraxial region thereof and an image-side surface 922 being concave in a paraxial region thereof, which are both aspheric, the second lens element 920 is made of plastic material, and the image-side surface 922 has at least one convex shape in an off-axis region thereof.

The third lens element 930 with positive refractive power has an object-side surface 931 being convex in a paraxial region thereof and an image-side surface 932 being concave in a paraxial region thereof, which are both aspheric, and the third lens element 930 is made of plastic material.

The fourth lens element 940 with positive refractive power has an object-side surface 941 being convex in a paraxial region thereof and an image-side surface 942 being concave in a paraxial region thereof, which are both aspheric, and the fourth lens element 940 is made of plastic material.

The fifth lens element 950 with positive refractive power has an object-side surface 951 being convex in a paraxial region thereof and an image-side surface 952 being concave in a paraxial region thereof, which are both aspheric, the fifth lens element 950 is made of plastic material, and both of the object-side surface 951 and the image-side surface 952 have at least one convex shape in an off-axis region thereof.

The IR-cut filter 970 is made of glass and located between the fifth lens element 950 and the image surface 980, and will not affect the focal length of the image capturing optical system. The image sensor 990 is disposed on or near the image surface 980 of the image capturing optical system.

The detailed optical data of the ninth embodiment is shown in TABLE 17, and the aspheric surface data is shown in TABLE 18, wherein the units of the curvature radius, the thickness and the focal length are expressed in mm, and HFOV is half of the maximal field of view.

TABLE 17

(Embodiment 9)
f = 7.81 mm, Fno = 1.83, HFOV = 19.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.369 | | | | |
| 2 | Lens 1 | 4.256 | ASP | 0.980 | Plastic | 1.544 | 55.9 | 12.42 |
| 3 | | 10.566 | ASP | 1.015 | | | | |
| 4 | Lens 2 | −27.721 | ASP | 0.500 | Plastic | 1.633 | 23.4 | −8.61 |
| 5 | | 6.825 | ASP | 0.386 | | | | |
| 6 | Lens 3 | 2.590 | ASP | 1.123 | Plastic | 1.544 | 55.9 | 22.39 |
| 7 | | 2.787 | ASP | 0.482 | | | | |
| 8 | Lens 4 | 2.664 | ASP | 1.680 | Plastic | 1.544 | 55.9 | 8.39 |
| 9 | | 4.971 | ASP | 0.485 | | | | |
| 10 | Lens 5 | 2.184 | ASP | 0.909 | Plastic | 1.530 | 55.8 | 92.26 |
| 11 | | 1.957 | ASP | 1.500 | | | | |
| 12 | IR-cut filter | Plano | | 0.300 | Glass | 1.517 | 64.2 | — |
| 13 | | Plano | | 0.958 | | | | |
| 14 | Image Surface | Plano | | — | | | | |

Note:
Reference wavelength is d-line 587.6 nm

TABLE 18

Aspheric Coefficients

| Surface# | 2 | 3 | 4 | 5 | 6 |
|---|---|---|---|---|---|
| k = | −1.7257E+00 | −1.4703E+01 | −5.0000E+01 | 2.9909E+00 | −2.7790E−01 |
| A4 = | −9.0723E−04 | −8.7041E−03 | −1.7874E−02 | −2.5164E−02 | −2.3770E−02 |
| A6 = | −7.1174E−04 | −1.7050E−03 | −2.5207E−03 | 1.9995E−03 | 3.9031E−03 |
| A8 = | 5.7658E−05 | 3.6757E−04 | 1.6376E−03 | −4.5654E−05 | −1.2303E−03 |
| A10 = | −4.6530E−05 | −8.4903E−05 | −3.6875E−04 | 1.0978E−05 | 1.5859E−04 |
| A12 = | 7.5583E−06 | 1.1860E−05 | 6.9560E−05 | 5.1926E−06 | −1.7682E−06 |
| A14 = | −9.0739E−07 | −8.5881E−07 | −8.0356E−06 | −9.3665E−07 | −7.4364E−07 |
| A16 = |  |  | 3.6294E−07 | 7.3674E−09 | 1.2945E−08 |

| Surface# | 7 | 8 | 9 | 10 | 11 |
|---|---|---|---|---|---|
| k = | 0.0000E+00 | −1.8980E+00 | −2.0000E+01 | −6.7345E+00 | −3.5550E+00 |
| A4 = | −3.2411E−02 | −1.9548E−03 | −1.4866E−02 | −2.1419E−02 | −2.5780E−02 |
| A6 = | 5.0197E−03 | 4.0671E−03 | 2.1752E−02 | −1.4158E−02 | −1.4664E−03 |
| A8 = | −2.6624E−03 | −2.4874E−03 | −7.7154E−03 | 1.2313E−02 | 3.5233E−03 |
| A10 = | 6.6021E−04 | 7.9789E−04 | 1.6639E−03 | −4.9403E−03 | −1.3981E−03 |
| A12 = | −9.4952E−05 | −1.8240E−04 | −2.0773E−04 | 1.1618E−03 | 2.8974E−04 |
| A14 = | 8.9509E−06 | 2.4274E−05 | 9.5262E−06 | −1.4813E−04 | −3.1958E−05 |
| A16 = | −4.4528E−07 | −1.3720E−06 | 8.4835E−08 | 7.7003E−06 | 1.4702E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

$9^{th}$ Embodiment

| f [mm] | 7.81 | R3/f2 | 3.22 |
|---|---|---|---|
| Fno | 1.83 | f2/f1 | −0.69 |
| HFOV [deg.] | 19.7 | f4/R6 | 3.01 |
| tan(HFOV) | 0.36 | Σ|f/fx| | 2.90 |
| Nmax | 1.633 | Rimg [mm] | ∞ |
| CT1/(CT2 + CT3) | 0.60 | SD11/SD52 | 0.88 |
| T12/(T23 + T34 + T45) | 0.75 |  |  |

10th Embodiment

Figure 10A:
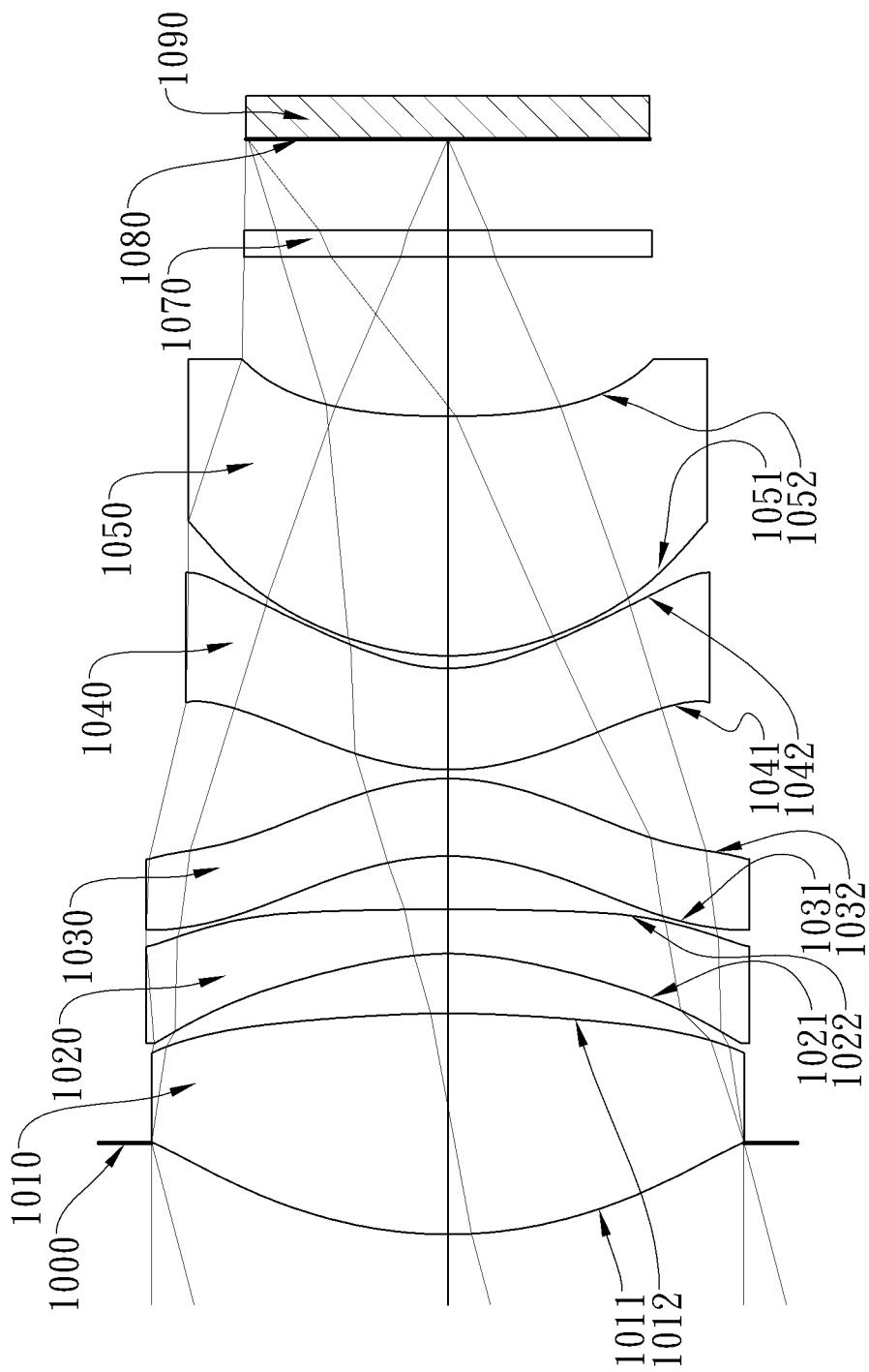
FIG. 10A is a schematic view of an image capturing device according to the 10th embodiment of the present disclosure.
Figure 10B:
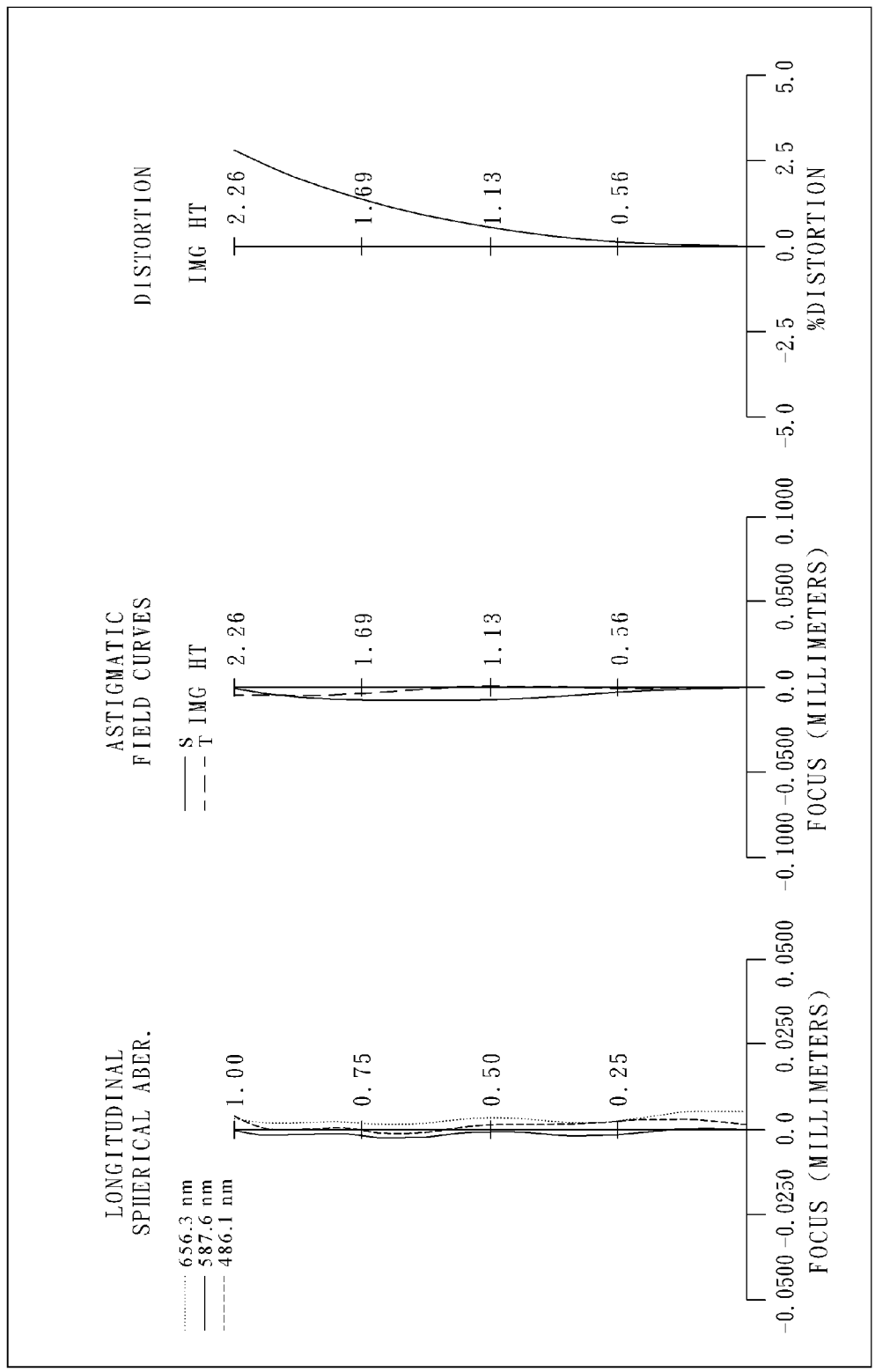
FIG. 10B shows spherical aberration curves, astigmatic field curves and a distortion curve of the image capturing device according to the 10th embodiment.

FIG. 10A is a schematic view of an image capturing device according to the 10th embodiment of the present disclosure. FIG. 10B shows, in order from left to right, spherical aberration curves, astigmatic field curves and a distortion curve of the image capturing device according to the 10th embodiment.

In FIG. 10A, the image capturing device includes the image capturing optical system (not otherwise herein labeled) of the present disclosure and an image sensor 1090. The image capturing optical system includes, in order from an object side to an image side, an aperture stop 1000, a first lens element 1010, a second lens element 1020, a third lens element 1030, a fourth lens element 1040, a fifth lens element 1050, an IR-cut filter 1070, and an image surface 1080, wherein the image capturing optical system has a total of five lens elements (1010-1050) with refractive power, which are non-cemented lens element.

The first lens element 1010 with positive refractive power has an object-side surface 1011 being convex in a paraxial region thereof and an image-side surface 1012 being convex in a paraxial region thereof, which are both aspheric, the first lens element 1010 is made of plastic material.

The second lens element 1020 with negative refractive power has an object-side surface 1021 being concave in a paraxial region thereof and an image-side surface 1022 being convex in a paraxial region thereof, which are both aspheric, the second lens element 1020 is made of plastic material, and the image-side surface 1022 has at least one convex shape in an off-axis region thereof.

The third lens element 1030 with positive refractive power has an object-side surface 1031 being concave in a paraxial region thereof and an image-side surface 1032 being convex in a paraxial region thereof, which are both aspheric, and the third lens element 1030 is made of plastic material.

The fourth lens element 1040 with negative refractive power has an object-side surface 1041 being convex in a paraxial region thereof and an image-side surface 1042 being concave in a paraxial region thereof, which are both aspheric, and the fourth lens element 1040 is made of plastic material.

The fifth lens element 1050 with positive refractive power has an object-side surface 1051 being convex in a paraxial region thereof and an image-side surface 1052 being concave in a paraxial region thereof, which are both aspheric, the fifth lens element 1050 is made of plastic material, and the object-side surface 1051 has at least one convex shape in an off-axis region thereof.

The IR-cut filter 1070 is made of glass and located between the fifth lens element 1050 and the image surface 1080, and will not affect the focal length of the image capturing optical system. The image sensor 1090 is disposed on or near the image surface 1080 of the image capturing optical system.

The detailed optical data of the tenth embodiment is shown in TABLE 19, and the aspheric surface data is shown in TABLE 20, wherein the units of the curvature radius, the thickness and the focal length are expressed in mm, and HFOV is half of the maximal field of view.

TABLE 19

(Embodiment 10)
f = 8.36 mm, Fno = 1.25, HFOV = 14.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −1.032 | | | | |
| 2 | Lens 1 | 5.140 | ASP | 2.495 | Plastic | 1.544 | 55.9 | 7.11 |
| 3 | | −13.006 | ASP | 0.675 | | | | |
| 4 | Lens 2 | −3.453 | ASP | 0.500 | Plastic | 1.639 | 23.5 | −6.01 |
| 5 | | −35.979 | ASP | 0.602 | | | | |
| 6 | Lens 3 | −2.969 | ASP | 0.877 | Plastic | 1.570 | 40.0 | 16.09 |
| 7 | | −2.483 | ASP | 0.100 | | | | |
| 8 | Lens 4 | 2.755 | ASP | 1.145 | Plastic | 1.639 | 23.5 | −15.32 |
| 9 | | 1.802 | ASP | 0.141 | | | | |
| 10 | Lens 5 | 2.827 | ASP | 2.706 | Plastic | 1.544 | 55.9 | 6.58 |
| 11 | | 8.911 | ASP | 1.800 | | | | |
| 12 | IR-cut filter | Plano | | 0.300 | Glass | 1.517 | 64.2 | — |
| 13 | | Plano | | 1.035 | | | | |
| 14 | Image Surface | Plano | | — | | | | |

Note:
Reference wavelength is d-line 587.6 nm

TABLE 20

Aspheric Coefficients

| Surface# | 2 | 3 | 4 | 5 | 6 |
|---|---|---|---|---|---|
| k = | −3.0576E+00 | −4.6156E+01 | −6.9174E+00 | −5.0000E+01 | −7.2890E+00 |
| A4 = | 2.2615E−03 | 1.3207E−03 | 8.0709E−03 | 4.2242E−03 | −1.6151E−02 |
| A6 = | −8.3279E−05 | −2.2269E−04 | −2.4903E−03 | −1.7645E−03 | 4.9827E−03 |
| A8 = | −3.3604E−07 | −1.9315E−05 | 3.4462E−04 | 1.4842E−04 | −7.7040E−04 |
| A10 = | 1.2613E−07 | 2.6321E−06 | −3.3055E−05 | 1.5008E−06 | 8.1725E−05 |
| A12 = | −6.0907E−08 | −5.7185E−08 | 1.9571E−06 | −9.6253E−07 | −5.2636E−06 |
| A14 = | 4.7826E−09 | −4.9423E−09 | −5.0622E−08 | 4.9142E−08 | 1.5415E−07 |
| A16 = | −1.9154E−10 | 2.0235E−10 | 9.7859E−11 | −4.0830E−10 | −6.6440E−10 |

| Surface # | 7 | 8 | 9 | 10 | 11 |
|---|---|---|---|---|---|
| k = | −5.6125E+00 | −2.7161E+00 | −4.9386E+00 | −2.3172E+00 | −9.1376E−01 |
| A4 = | −9.3734E−03 | −3.7064E−03 | 2.5436E−03 | −2.0893E−02 | 8.1160E−03 |
| A6 = | 2.8620E−03 | 2.3848E−04 | 2.9722E−03 | 1.7072E−02 | 3.9250E−04 |
| A8 = | −2.8370E−04 | −4.0129E−05 | −1.8309E−03 | −6.4662E−03 | −1.4665E−04 |
| A10 = | 8.5416E−06 | −1.6591E−05 | 3.7930E−04 | 1.4417E−03 | 1.6024E−04 |
| A12 = | 1.5802E−06 | 2.9199E−06 | −3.0625E−05 | −1.8181E−04 | −6.4921E−05 |
| A14 = | −2.0568E−07 | −3.2716E−08 | 3.7897E−07 | 1.2134E−05 | 1.2488E−05 |
| A16 = | 7.0715E−09 | −1.1020E−08 | 3.8741E−08 | −3.3740E−07 | −8.6998E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 8.36 | R3/f2 | 0.57 |
| Fno | 1.25 | f2/f1 | −0.85 |
| HFOV [deg.] | 14.7 | f4/R6 | 6.17 |
| tan(HFOV) | 0.26 | Σ|f/fx| | 4.90 |
| Nmax | 1.639 | Rimg [mm] | ∞ |
| CT1/(CT2 + CT3) | 1.81 | SD11/SD52 | 1.44 |
| T12/(T23 + T34 + T45) | 0.80 | | |

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical system comprising, in order from an object side to an image side:

a first lens element with positive refractive power having an object-side surface being convex in a paraxial region thereof;

a second lens element with negative refractive power having an object-side surface being concave in a paraxial region thereof;

a third lens element;

a fourth lens element having an object-side surface being convex in a paraxial region thereof and an image-side surface being concave in a paraxial region thereof, the object-side surface and the image-side surface thereof being aspheric; and a fifth lens element having an object-side surface being convex in a paraxial region thereof and an image-side surface being concave in a paraxial region thereof, the object-side surface and the image-side surface thereof being aspheric, the image-side surface having at least one convex shape in an off-axis region thereof;

wherein the image capturing optical system has a total of five lens elements with refractive power and an air gap is arranged between every two adjacent lens elements with refractive power;

wherein a focal length of the second lens is f2, a focal length of the first lens element is f1, a curvature radius of the object-side surface of the second lens element is R3, and the following conditions are satisfied:

$-1.0 < f2/f1 < 0$; and $0 < R3/f2$.

2. The image capturing optical system of claim 1, wherein the third lens element has positive refractive power.

3. The image capturing optical system of claim 1, wherein the focal length of the second lens is f2, a focal length of any one of the first lens element, the third lens element, the fourth lens element and the fifth lens element is fy (that is, y is 1, 3, 4 or 5), and the following condition is satisfied:

$|f2| < |fy|$.

4. The image capturing optical system of claim 1, wherein the fifth lens element has positive refractive power.

5. The image capturing optical system of claim 1, wherein a focal length of the image capturing optical system is f, a focal length of any one of the first lens element, the second lens element, the third lens element, the fourth lens element and the fifth lens element is fx (that is, x is 1, 2, 3, 4 or 5), and the following condition is satisfied:

$6.0 < \Sigma |f/fx|$.

6. The image capturing optical system of claim 1 further comprising an image surface, wherein a curvature radius of the image surface is Rimg, and the following condition is satisfied:

$-500$ [mm] $< Rimg < -20$ [mm].

7. The image capturing optical system of claim 1, wherein an effective radius of the object-side surface of the first lens element is SD11, an effective radius of the image-side surface of the fifth lens element is SD52, and the following condition is satisfied:

$1.0 < SD11/SD52 < 1.6$.

8. The image capturing optical system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$0.60 < T12/(T23+T34+T45) < 4.0$.

9. The image capturing optical system of claim 1, wherein a focal length of the fourth lens element is f4, a curvature radius of the image-side surface of the third lens element is R6, and the following condition is satisfied:

$-0.5 < f4/R6 < 2.0$.

10. An image capturing device comprising the image capturing optical system of claim 1 and an image sensor.

11. An electronic device comprising the image capturing device of claim 10.

* * * * *